(12) United States Patent
Kujiraoka

(10) Patent No.: US 7,583,353 B2
(45) Date of Patent: Sep. 1, 2009

(54) LIQUID CRYSTAL DISPLAY AND METHOD OF ASSEMBLING LIQUID CRYSTAL DISPLAY WITH PLURAL OPTICAL SHEETS HAVING IDENTIFICATION PARTS CORRESPONDING TO THE POSITION OF THE OPTICAL SHEETS

(75) Inventor: Hideki Kujiraoka, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 251 days.

(21) Appl. No.: 11/635,504

(22) Filed: Dec. 8, 2006

(65) Prior Publication Data

US 2007/0132912 A1 Jun. 14, 2007

(30) Foreign Application Priority Data

Dec. 14, 2005 (JP) ............................. 2005-360402

(51) Int. Cl.
G02F 1/157 (2006.01)
G02F 1/1333 (2006.01)

(52) U.S. Cl. .......................... 349/187; 349/58; 349/62; 362/616

(58) Field of Classification Search ............. 349/61–71; 362/31, 246

See application file for complete search history.

(56) References Cited

U.S. PATENT DOCUMENTS 6,490,016 B1 * 12/2002 Koura ........................ 349/58
6,612,710 B2 * 9/2003 Suzuki et al. ............... 362/600
2004/0056993 A1 * 3/2004 Kim et al. ................... 349/110
2006/0147175 A1 * 7/2006 Shinohara ................... 385/146

FOREIGN PATENT DOCUMENTS

JP 2000-11728 1/2000
JP 2004-333520 11/2004

* cited by examiner

Primary Examiner—Andrew Schechter
Assistant Examiner—Jessica M Merlin
(74) Attorney, Agent, or Firm—McGinn IP Law Group, PLLC

(57) ABSTRACT

The invention provides a backlight unit, a liquid crystal display apparatus and a method of assembling the backlight unit in which a large number of optical sheets can be simply and surely assembled into a chassis in an appropriate order and direction, and is characterized by a first optical sheet which is a reference sheet and second optical sheets which are rest of the optical sheets. The first optical sheet is provided with first identification parts for specifying a layer of respective second optical sheets to be placed, and each of the second optical sheets is provided with a second identification part at a position corresponding to one of the first identification parts based on the layer position to be placed. The optical sheets are superposed so that each of the first identification parts is pared with the second identification part corresponding to the layer specified by the first identification part.

15 Claims, 19 Drawing Sheets

LIQUID CRYSTAL DISPLAY AND METHOD OF ASSEMBLING LIQUID CRYSTAL DISPLAY WITH PLURAL OPTICAL SHEETS HAVING IDENTIFICATION PARTS CORRESPONDING TO THE POSITION OF THE OPTICAL SHEETS

BACKGROUND OF THE INVENTION

1. Field of the Invention

The present invention relates to a backlight unit in which a plurality of optical sheets are to be placed, a liquid crystal display apparatus equipped with such a backlight unit and a, method of assembling the backlight unit by a plurality of optical sheets.

2. Description of the Related Art

A liquid crystal display apparatus has been widely used as a monitor apparatus for an office automation (OA) apparatus, television and others because of its characteristics such as compactness, thinness and low-power consumption. The liquid crystal display apparatus is mainly composed of a liquid crystal panel in which liquid crystal held between opposing transparent substrates and a backlight unit for radiating backlight to illuminate the liquid crystal panel.

The backlight unit is primarily composed of a light source for radiating illuminating light (so-called "backlight"), a light guide plate for guiding the illuminating light equally, several kinds of optical sheets such as a diffusion sheet, lens sheet and polarizing sheet, a reflection sheet for reflecting the illuminating light leaking out to the rear side toward a liquid crystal panel and a chassis for holding these components.

For an optical sheet used in a backlight unit, serializing order, the front and back thereof, and up/down and left/right directions are predetermined for assembling into a chassis. However, every optical sheet is very similar in appearance and difficult to distinguish between front and rear faces, so that it is liable to be placed in a wrong order and/or a wrong direction. If the optical sheet is assembled in an incorrect order or an incorrect direction, it causes a defect that luminance of the backlight unit is lowered or luminance is not evenly distributed.

Therefore, in a conventional method for assembling the backlight unit, plural optical sheets have been sequentially superposed while checking functions of each of optical sheets by referring to specifications. If different optical sheets are mixed, it is difficult to discriminate them, so that the optical sheets are kept for each of the types in trays and bags on which each of names of the optical sheets are written to readily discriminate the types. Even in working for superposing the optical sheets, they are classified using trays on which the names of respective optical sheets are written for preventing the optical sheets from being mixed.

Japanese Patent Laid-Open Nos. 2000-11728 and 2004-333520 disclose optical sheets with a structure which can place each optical sheet in an appropriate order and direction.

The optical sheet disclosed in Japanese Patent Laid-Open No. 2000-11728 has a structure with a lug part for each optical sheet. A position of the lug part for each optical sheet is shifted from one another among a set of optical sheets, and a part of the lug part of one optical sheet is sequentially superposed on the lug part of the other optical sheet. The optical sheet disclosed in Japanese Patent Laid-Open No. 2004-333520 has a structure with a notch for each optical sheet. The notch is provided on the periphery of the optical sheet, and a position of the notch for each optical sheet is shifted from one another among a set of optical sheets, and the notches are different from each other in size and shape.

The optical sheets disclosed in Japanese Patent Laid-Open Nos. 2000-11728 and 2004-333520 are so structured as to sequentially shift positions where the lug parts and the notches of the optical sheets are provided. That is to say, it is structurally intended that the optical sheets continuously placed upward and downward are sequentially associated with each other.

For this reason, when a part of the optical sheets should be removed due to revision of specifications of an apparatus, for example, the optical sheets those which have been placed on and beneath the optical sheet to be removed can not be associated with each other any more. As a result, if a part of the optical sheets is removed, all the optical sheets placed on and over the removed optical sheet should be replaced by new optical sheets in which the positions of lug parts and the notches are also modified to keep sequential association with each other among rest of the optical sheets, which causes a problem in that it takes much time and labor and cost is increased.

This problem is described with reference to FIGS. 24A and 24B and FIGS. 25A and 25B.

FIG. 24A is a plan view schematically showing the state where lug parts 16a to 16d so formed as to shift in position from each other and as to partially and sequentially superposed on each other are provided on the four optical sheets 15a to 15d. FIG. 24B is a plan view schematically showing the state where all of the four optical sheets 15a to 15d are superposed. That is to say, when all of the four optical sheets 15a to 15d are superposed, as is clear from FIG. 24B, the lug parts 16a to 16d are partially and continuously superposed.

FIG. 25A is a plan view schematically showing the state where out of the above four-layer optical sheets 15a to 15d the second-layer optical sheet 15b is removed. FIG. 25B is a plan view schematically showing the state where the other three optical sheets 15a, 15c and 15d left after the second optical sheet 15b has been removed are superposed As shown in FIG. 25B, in the structure of a conventional optical sheet, if the second optical sheet 15b has been removed, the lug part 16a of the bottom-layer optical sheet 15a is separated from the lug parts 16c and 16d of the two optical sheets 15c and 15d which are placed over the bottom layer. For this reason, the two optical sheets 15c and 15d need to be replaced by new optical sheets in which the respective positions of lug parts 16c and 16d are modified to keep sequential association with each other among the optical sheets 15a, 15c and 15d.

In addition, in the structure of a conventional optical sheet, when a part of the optical sheets should be replaced by another new optical sheet due to revision of specifications of the apparatus, the old optical sheet to be replaced and the new replacing optical sheet should be the same in shape to keep the current association among all optical sheets (in other words, the association between the old optical sheet to be replaced and rest of the remaining optical sheets should also be kept in the association between the new replacing optical sheet and rest of the remaining optical sheets). That is to say, the lug part and the notch formed on the new replacing optical sheet should be the same in shape and place as those formed on the old optical sheet to be replaced. For this reason, it is difficult to distinguish between the old optical sheet to be replaced and the new replacing optical sheet from appearance, which causes confusion in which the optical sheets before and after replacement are mixed up.

The lug part and the notch provided on the conventional optical sheet merely show the order and direction in which each optical sheet is placed, but not showing information related to the optical sheet. Therefore, in order to obtain information on the optical sheet such as functions, manufacturer's name, revision number, thickness and others, it is necessary to refer to specifications each time, which causes a problem in that work efficiency is lowered.

The present invention has been made in view of the above problems. Objects of the present invention are to provide a backlight unit, a liquid crystal display apparatus and a method of assembling the backlight unit in which a large number of optical sheets can be simply and surely assembled into a chassis in an appropriate order and direction, to provide the same which allow flexibly coping with a change in structure of the optical sheet, and also to provide the same in which information of each optical sheet can be easily obtained to improve work efficiency.

SUMMARY OF THE INVENTION

According to the present invention, a backlight unit, a liquid crystal display apparatus equipped with the backlight unit and a method of assembling the backlight unit are characterized by the following first optical sheet and second optical sheet.

The first optical sheet is one of a plurality of optical sheets to be assembled in a chassis of the backlight unit, and provided with first identification parts of the same number as rest of the plurality of optical sheets other than the first optical sheet at predetermined positions around the periphery of the sheet. The second optical sheet is the rest of the plurality of optical sheets other than the first optical sheet and to be placed following the first optical sheet when assembled into the chassis, and provided with a second identification part at a position corresponding to one of the first identification parts. The second identification part is so shaped that at least a part of the corresponding first identification part can be visually recognized when viewed from an assembling direction of the plurality of optical sheets.

More specifically, each of the first identification parts is allocated in predetermined order to specify a layer position where each of the second optical sheets is to be placed. When there are a plurality of second optical sheets, the second identification part provided on each of the plurality of second optical sheets is allocated at a position corresponding to one of the first identification parts based on the layer position where each of the plurality of second optical sheets is to be placed.

Moreover, according to the present invention, it is flexible to provide different size and different shape of the first identification parts each other, and also it is flexible to provide different size and different shape of the second identification part from the corresponding first identification part.

Therefore, the present invention has a first effect that a plurality of optical sheets can be simply and surely assembled into a chassis in an appropriate order and direction at assembling steps of the backlight unit. This is realized by merely checking whether each of the first identification parts is paired with the respective second identification parts, and this allows easily confirming that a plurality of optical sheets are arranged without omission.

And also, as a second effect of the present invention, it allows flexible coping with change in structure of the optical sheet to be assembled, because each one of the second optical sheets is only associated with the first optical sheet. For this reason, even when a part of the optical sheets should be removed or replaced due to revision of specifications, the optical sheets to be newly prepared can be minimized and also flexibly altered in shape of the newly prepared optical sheet for easy discrimination.

Moreover, according to the present invention, at least one of the optical sheets is provided with an information indicating part for indicating information on the optical sheet at a position different from positions where the first and the second identification parts are located. In this case, the information on the optical sheet includes any one of characteristic, manufacturer's name, revision number, and thickness of the optical sheet. The information indicating part can be different in at least one of quantity, shape such as at least one of convex, concave and hole, and position according to the contents of the information on the optical sheet.

Therefore, the present invention has a third effect that information on each optical sheet can be easily obtained without reference to specifications, which improves work efficiency. For this reason, even though workers do not have any knowledge about functions of optical sheets which they are handling, they can easily discriminate and identify optical sheets by only referring to the information indicating part of the optical sheet, and this enables simplifying work instruction, reducing hours of work, simplifying stock control and storage and easily discriminating and identifying each optical sheet when reused.

BRIEF DESCRIPTION OF THE DRAWINGS

Exemplary features and advantages of the present invention will become apparent from the following detailed description when taken with the accompanying drawings in which:

FIG. 4A shows a second-layer optical sheet, FIG. 4B shows a third-layer optical sheet and FIG. 4C shows a fourth-layer optical sheet;

FIG. 20A shows the case where convexes on a first information indicating part are two in number and convexes on a second information indicating part are two in number, FIG. 20B shows the case where a convex on the first information indicating part is one in number and a convex on the second information indicating part is one in number and FIG. 20C shows the case where a convex on the first information indicating part is one in number and convexes on the second information indicating part are two in number;

FIG. 21A shows a first and a second information indicating part which are concave and FIG. 21B shows the first and the second information indicating part which are hole-shaped;

FIG. 22A shows the case where two kinds of shapes: concave and hole on the information indicating parts are combined, and FIG. 22B shows the case where three kinds of shapes: convex, concave and hole on the information indicating parts are combined;

FIG. 23A shows the case where a first information indicating part is semicircular convex and a second information indicating part is trapezoidal convex, FIG. 23B shows the case where a first information indicating part is a circular hole in shape and a second information indicating part is a rectangular hole in shape, FIG. 23C shows the case where a first information indicating part is semicircular concave and a second information indicating part is trapezoidal convex, FIG. 23D shows the case where a first information indicating part is a combination of a semicircular convex and a rectangular hole in shape and a second information indicating part is semicircular concave, and FIG. 23E show the case where a shape indicating a boundary is provided between the first and the second information indicating parts;

DESCRIPTION OF THE EXEMPLARY EMBODIMENTS

Figure 1:
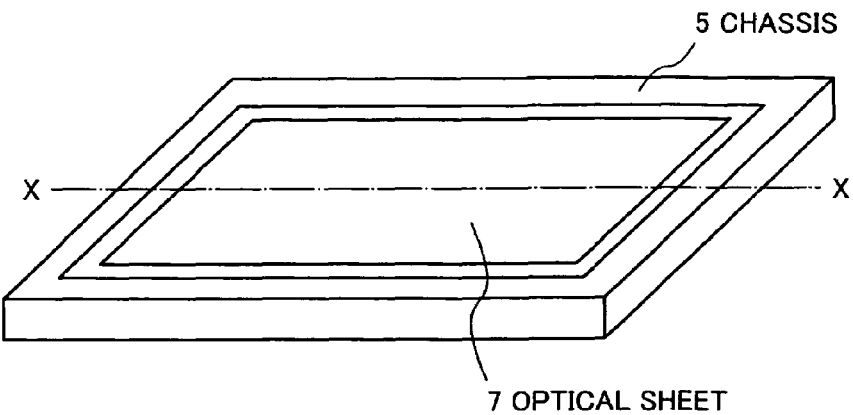
FIG. 1 is a perspective view schematically showing a backlight unit related to a first embodiment of the present invention.

As described in the part of the related art herein, an illuminating apparatus such as a backlight unit and the like uses a plurality of optical sheets such as a diffusion sheet, lens sheet, polarizing sheet and so forth. As an order and a direction for placing these optical sheets are specified, the optical sheets each having lug parts and the notches, which are shifted from each other in position, are conventionally used for confirming whether a plurality of optical sheets are properly placed.

However, in such a conventional structure, if a part of the optical sheets should be removed due to revision of specifications of an apparatus, all the optical sheets placed on and over the removed optical sheet should also be replaced by new optical sheets in which the positions of lug parts and the notches are modified. If a part of the optical sheets should be replaced by another new optical sheet due to revision of specifications of the apparatus, the lug part and the notch formed on the new replacing optical sheet should also be the same in shape and place as those formed on the old optical sheet to be removed. For this reason, it is difficult to distinguish between the old removed optical sheet and the new replacing optical sheet only from appearance in a conventional art.

This problem results in the conventional structure in which the lug parts and the notches of optical sheets continuing upward and downward are sequentially associated with each other. For this reason, in the present invention, one of a plurality of optical sheets (normally, an optical sheet to be placed on a first layer) is treated as a first optical sheet as a reference sheet, and one or more optical sheets placed following the first optical sheet when assembled (i.e., placed on the first optical sheet if an optical sheet is assembled into a chassis) are treated as a second optical sheet, thereby the second optical sheets each are associated only with the first optical sheet (in other words, the second optical sheets are not associated with one another). First identification parts are provided on the first optical sheet, and the number of the first identification parts is the same number as the number of sheets of the second optical sheet to be placed over the first optical sheet. On each of the second optical sheets, a second identification part is provide at a position corresponding to one of the first identification parts in a predetermined order. Therefore, it is confirmed whether each of the first identification parts are paired with the respective second identification parts when they are superposed. This allows a plurality of optical sheets to be placed in proper order and direction and to flexibly cope with altering in structure of the optical sheets to be assembled.

The lug part and the notch provided on the conventional optical sheet merely show the order and direction of each optical sheet, but not showing information related to the optical sheet. Therefore, information on the optical sheet such as functions, manufacturer's name, revision number, thickness and others cannot be obtained, unless specifications thereof are referred to, as a result, the optical sheet cannot be identified by itself. However, in the present invention, an information indicating part for indicating information on each optical sheet is provided in addition to the first and the second identification parts to discriminate and identify each optical sheet only by referring to the information indicating part of the optical sheet. The present invention is described in detail in the following with reference to the drawings.

First Embodiment

Figure 2:
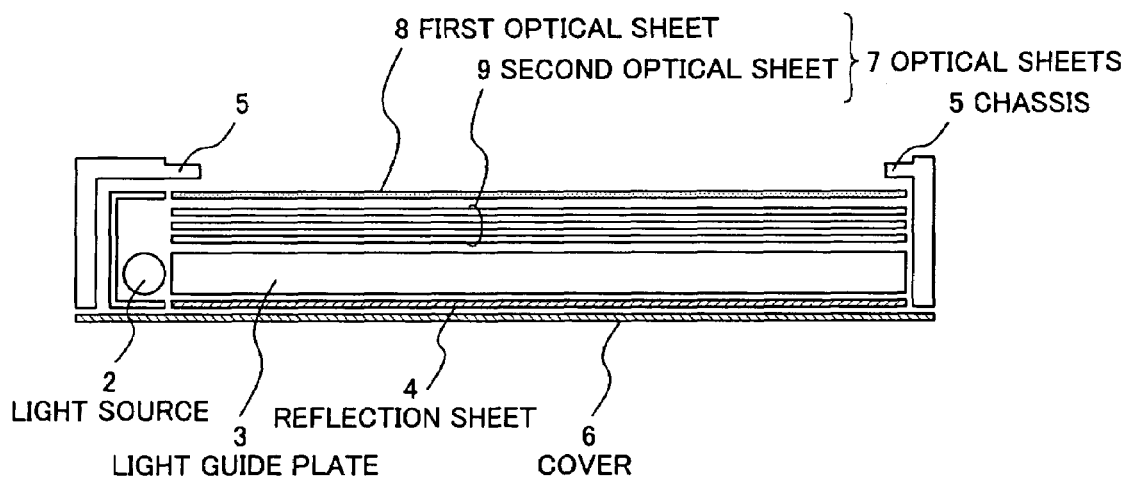
FIG. 2 is a cross section showing the structure of the backlight unit related to the first embodiment of the present invention.
Figure 3:
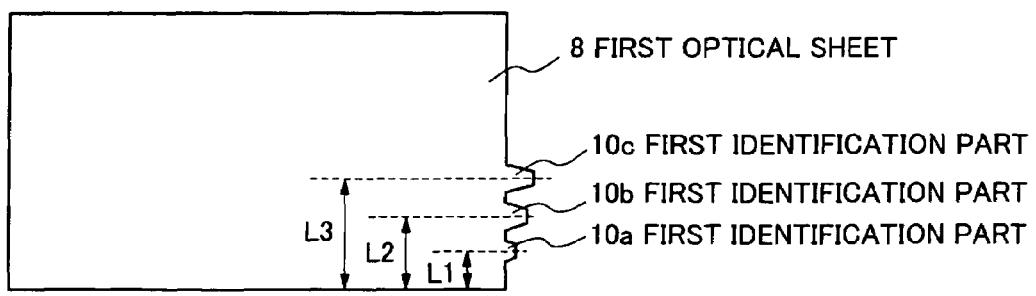
FIG. 3 is a plan view schematically showing the structure of a first optical sheet related to the first embodiment of the present invention.
Figure 4A:
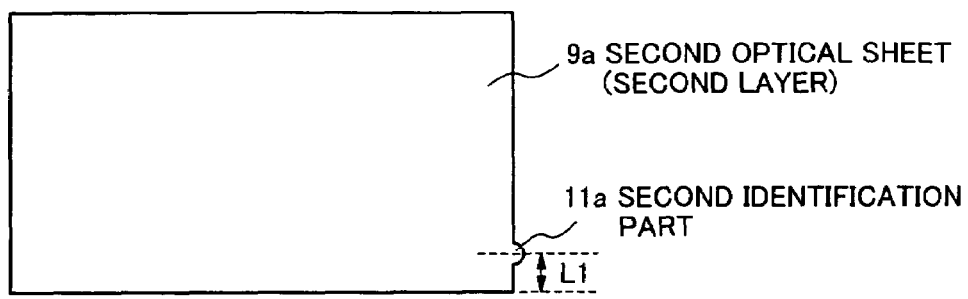
FIGS. 4A to 4C are plan views schematically showing the structure of respective second optical sheets related to the first embodiment of the present invention.
Figure 4B:
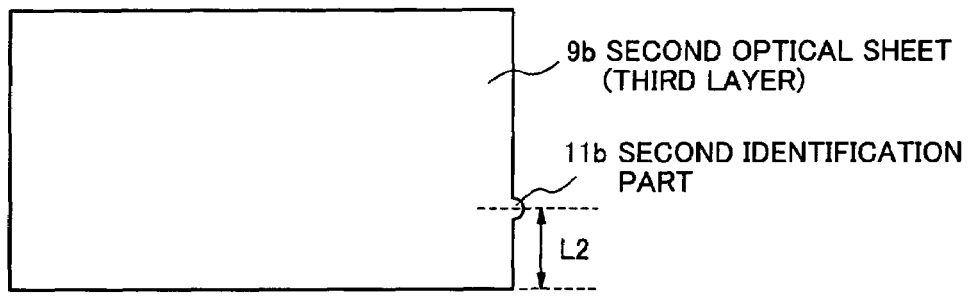
Figure 4C:
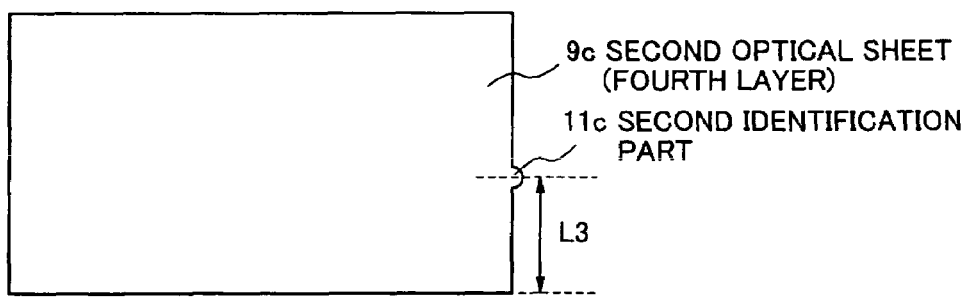
Figure 5A:
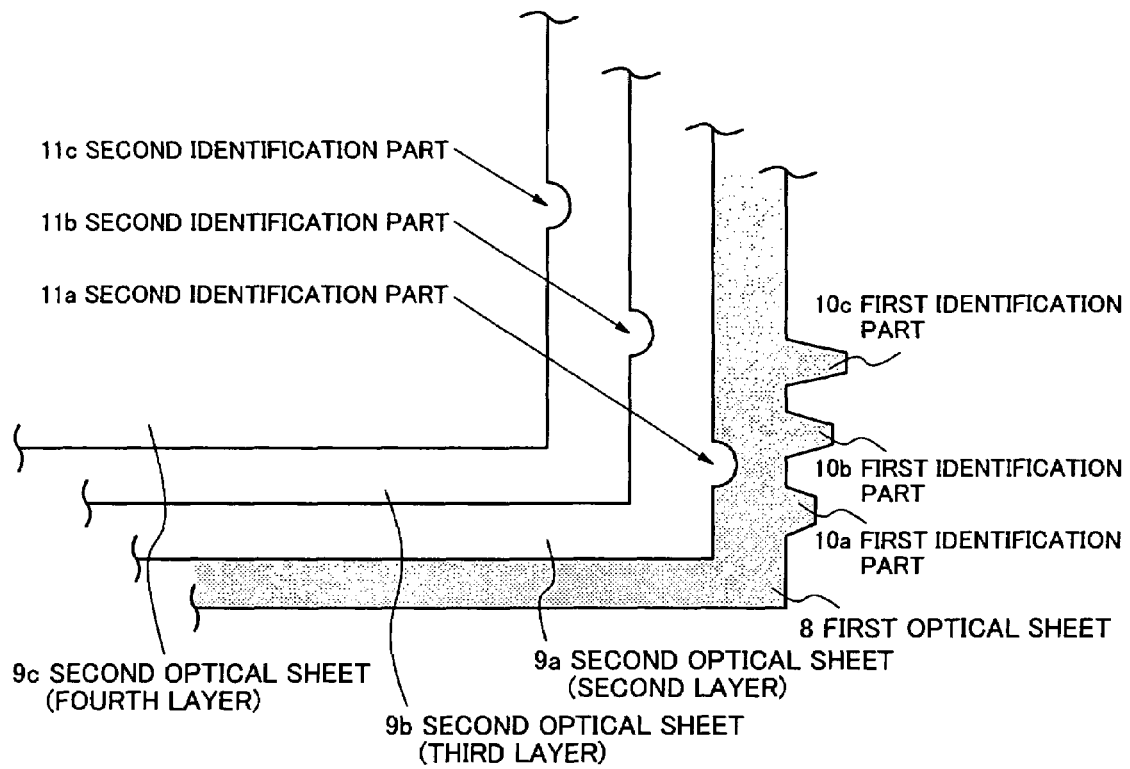
FIG. 5A is a plan view schematically showing the relationship between a first identification part of the first optical sheet and each of second identification parts of the second optical sheets related to the first embodiment of the present invention.
Figure 5B:
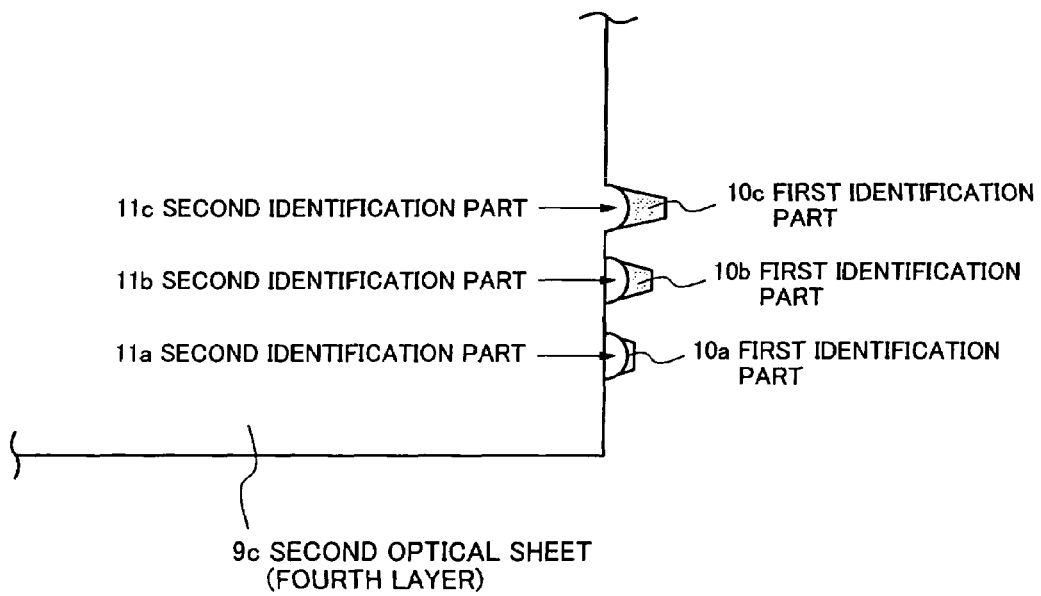
FIG. 5B is a plan view schematically showing the state where those optical sheets are superposed.
Figure 6:
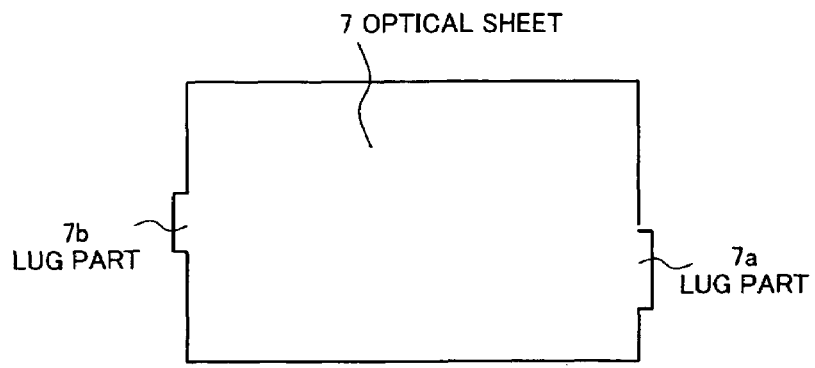
FIG. 6 is a plan view showing another structure of an optical sheet related to the first embodiment of the present invention.

Referring to FIG. 1 through FIGS. 18A and 18B, are described a backlight unit and a liquid crystal display apparatus equipped with the backlight unit and a method of assembling the backlight unit related to the first embodiment of the present invention. FIG. 1 is a perspective view schematically showing a backlight unit related to the present embodiment. FIG. 2 is a cross section along line X-X in FIG. 1. FIG. 3 is a plan view schematically showing the structure of a first optical sheet and FIGS. 4A to 4C are plan views schematically showing the structure of respective second optical sheets. FIGS. 5A and 5B are plan views schematically showing the state where the first and the second optical sheets are superposed. FIG. 6 is a plan view showing an other structure of an optical sheet. FIGS. 7A and 7B through FIGS. 18A and 18B show applications and modifications of the structure of the optical sheets according to the present embodiment.

In general, a liquid crystal display apparatus is mainly composed of a liquid crystal panel (irrespective of shape, structure and driving method) and a backlight unit for illuminating the liquid crystal panel with backlight. The liquid crystal panel is constituted by a first substrate on which switching elements such as Thin Film Transistors (TFT) are formed on pixels arranged in a matrix form, a second substrate on which color filters and black matrix are formed and liquid crystal is filled and held between those substrates.

A backlight unit 1 includes; as shown in FIGS. 1 and 2, a light source 2 such as a cold cathode lamp or an LED for illuminating a liquid crystal display panel, a light guide plate 3 for guiding light emitted from the light source 2 to the entire surface of the backlight unit, some of optical sheets 7 for obtaining optical effects, a reflection sheet 4 for reflecting light emitted from the light guide plate 3 to the rear side thereof toward the liquid crystal panel, and a chassis 5 and a cover 6 for holding these composing members. The optical sheets 7 include a diffusion sheet for uniformly diffusing light emitted from the light guide plate 3, a lens sheet for converging diffused light on each pixel and a polarizing sheet for polarizing converged light. The optical sheets 7 are composed of a first optical sheet 8 as a reference sheet (normally, an optical sheet which is placed at first among a plurality of optical sheets 7 when assembled) and one or more second optical sheets 9 placed following the first optical sheet 8 when assembled.

Incidentally, while FIG. 2 shows an edge light type backlight unit 1, the present invention may be applied to backlight units different from in type such as direct type, planar light source type and others. In addition, the present invention is characterized by the optical sheet. The other composing elements are not particularly limited. It is possible to perform modifications by providing light shielding tape around the chassis 5, for example. The optical sheet is a generic name of a sheet or a plate member with optical functions. The optical sheets 7 may be freely combined with the diffusion sheet, lens sheet or polarizing sheet, or may include a sheet other than the above. In the present embodiment, it is assumed that each of the optical sheets 7 is sequentially placed from the side of the opening (i.e., upper side in FIG. 2) of the chassis 5, so that one of the optical sheets 7 on the side of the opening of the chassis 5 is treated as the first optical sheet 8. If each of the optical sheets 7 is sequentially placed from the side of the light guide plate 3, the optical sheet 7 on the side of the light guide plate 3 may be treated as the first optical sheet 8.

As shown in FIG. 3, identifying means (hereinafter, referred to as first identification parts 10a to 10c) of the same number as the second optical sheets 9 are formed at arbitrary positions at the periphery (e.g., lower part of right side) of the first optical sheet 8. In addition, as shown in FIGS. 4A to 4C, on each of the second optical sheets 9a to 9c placed on each layer, it is provided with identifying means (hereinafter, referred to as second identification parts 11a to 11c respectively) which is allocated at each position corresponding to one of the first identification parts in a predetermined order. Each of the second identification part is so shaped that at least a part of the corresponding first identification part can be visually recognized when viewed from the assembling direction of the optical sheets. Each of the second optical sheets 9 is so structured that the respective second optical sheets 9a to 9c can uniquely be identified according to the allocated position of each of the second identification parts 11a to 11c, which is defined by distance of L1 to L3 as shown in FIGS. 4A to 4C (L1 to L3 is distance from bottom of the sheet to end of each of the second identification parts 11a to 11c). In other words, each of the first identification parts 10a to 10c is allocated in predetermined order to specify each layer position for the second optical sheets 9a to 9c, and the second identification part provided on each of the second optical sheets 9a to 9c is allocated at a position corresponding to one of the first identification parts based on the layer position where the second optical sheet is to be placed. Therefore, as shown in FIG. 3, the first identification part 1a specifies the second layer, the first identification part 10b specifies the third layer and the first identification part 10c specifies the fourth layer respectively. And also as shown in FIGS. 4A to 4c, the second optical sheet 9a to be placed on the second layer has the second identification part 11a at the position corresponding to the first identification part 10a, the second optical sheet 9b to be placed on the third layer has the second identification part 11b at the position corresponding to the first identification part 10b and the second optical sheet 9c to be placed on the fourth layer has the second identification part 11c at the position corresponding to the first identification part 10c respectively.

Incidentally, while it is described in the present embodiment that the number of optical sheets 7 is four (four-layered optical sheets 7), the present invention can be applicable to the case that the number of optical sheets 7 may be two or more. In addition, while it is described in the present embodiment in FIG. 2 that the first placed optical sheet, when assembled, is treated as the first optical sheet 8 and the rest of three optical sheets placed following the first optical sheet are treated as the second optical sheets 9, it may treat not always like this manner. If the first placed optical sheet is distinguishable in appearance from other optical sheets, for example, the second-layered optical sheet may be treated as the first optical sheet 8 and other optical sheets placed afterward may be the second optical sheet 9.

In FIG. 3 and FIGS. 4A to 4C, while the first identification parts 10a to 10c and the second identification parts 11a to 11c are provided at the lower right part of the optical sheet, they may be provided anywhere in the optical sheet. As shown in FIG. 6 as example of another structure, if the optical sheet has a lug part 7a, the first identification parts 10a to 10c or the second identification parts 11a to 11c may be formed on the lug part 7a. In FIG. 3 and FIGS. 4A to 4C, while the optical sheet 7 is transversely oblong, the optical sheet is optional in shape depending on a function or a shape of the liquid crystal display apparatus which uses this backlight unit, i.e., it may be a vertically oblong.

Figure 7A:
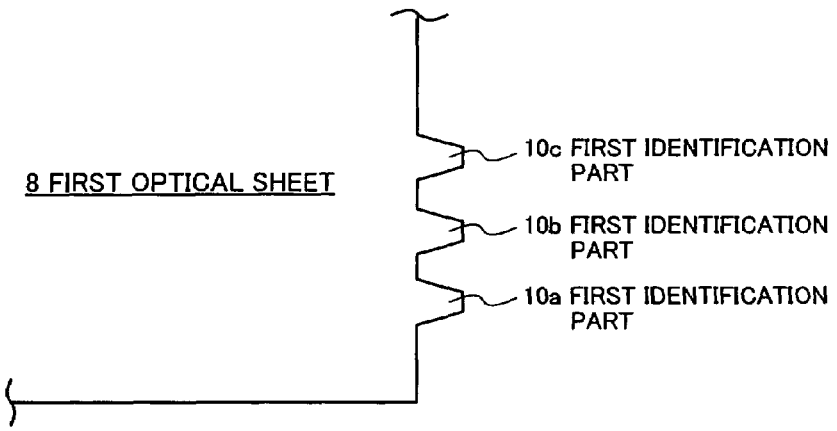
FIGS. 7A and 7B are plan views showing other structures of the first optical sheet related to the first embodiment of the present invention respectively.
Figure 7B:
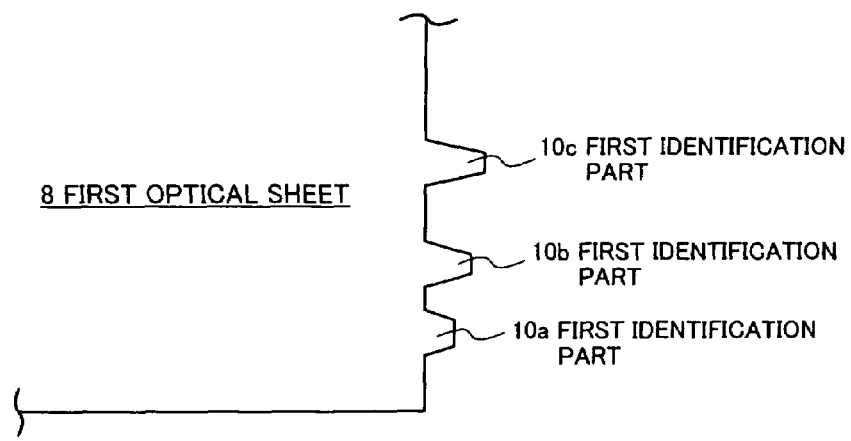

In FIG. 3, while the first identification parts 10a to 10c provided on the first optical sheet 8 are different in shape from each other (i.e., gradually increase in size in this figure) for the special benefit of easy discrimination of the respective second optical sheets 9a to 9c, the first identification parts 10a to 10c each do not always need to be different in shape or size. For example, as shown in FIG. 7A, the first identification parts 10a to 10c may be the same in shape. In addition, in FIG. 3, the first identification parts 10a to 10c are allocated at even intervals each other, but the interval distance between each other is optional. As shown in FIG. 7B, the first identification parts 10a to 10c may be irregularly spaced each other.

Figure 8A:
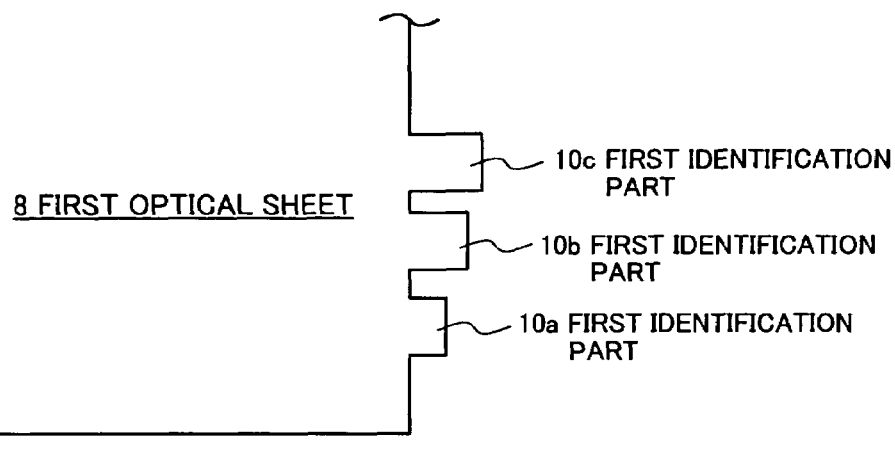
FIGS. 8A and 8B are plan views showing other structures of the first optical sheet related to the first embodiment of the present invention respectively.
Figure 8B:
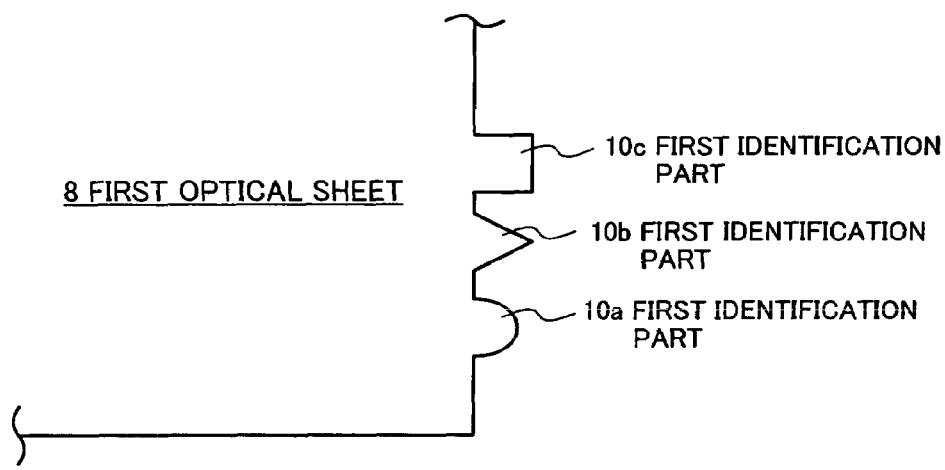

In FIG. 3 and FIGS. 7A and 7B, although the first identification parts 10a to 10c are trapezoidal, the first identification parts 10a to 10c are optional in shape. For example, as shown in FIG. 8A, they may be rectangular, semicircular, or triangular. As shown in FIG. 8B, the first identification parts 10a to 10c may be structured by combining plural different types of shapes.

Figure 9:
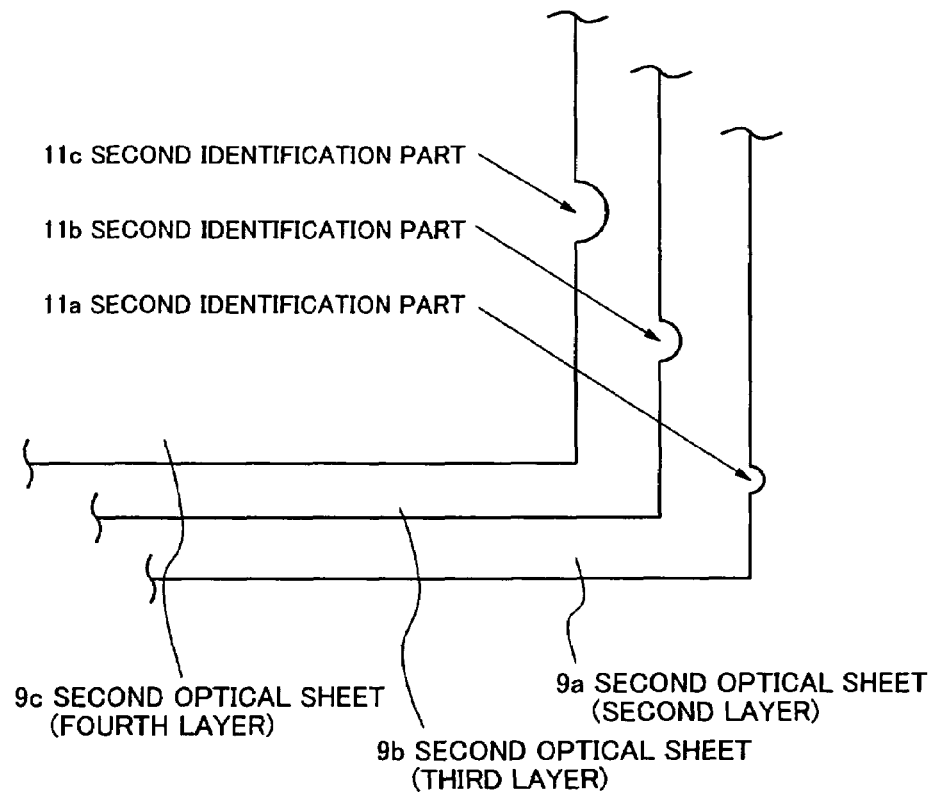
FIG. 9 is a plan view showing another structure of the second optical sheets related to the first embodiment of the present invention.
Figure 10:
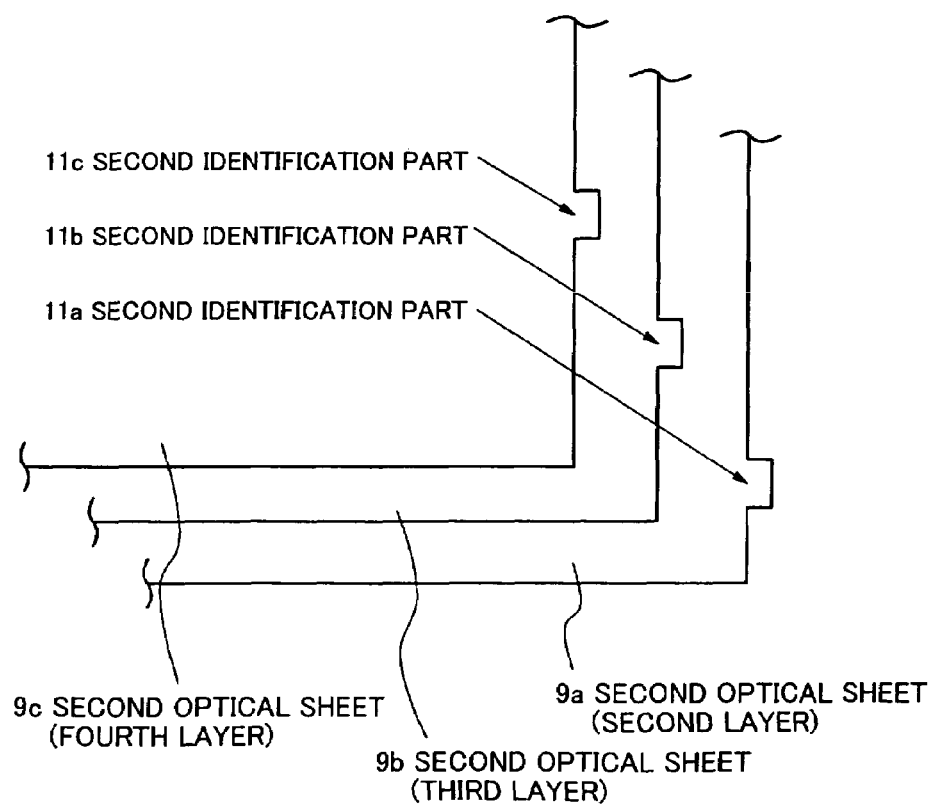
FIG. 10 is a plan view showing another structure of the second optical sheets related to the first embodiment of the present invention.
Figure 11:
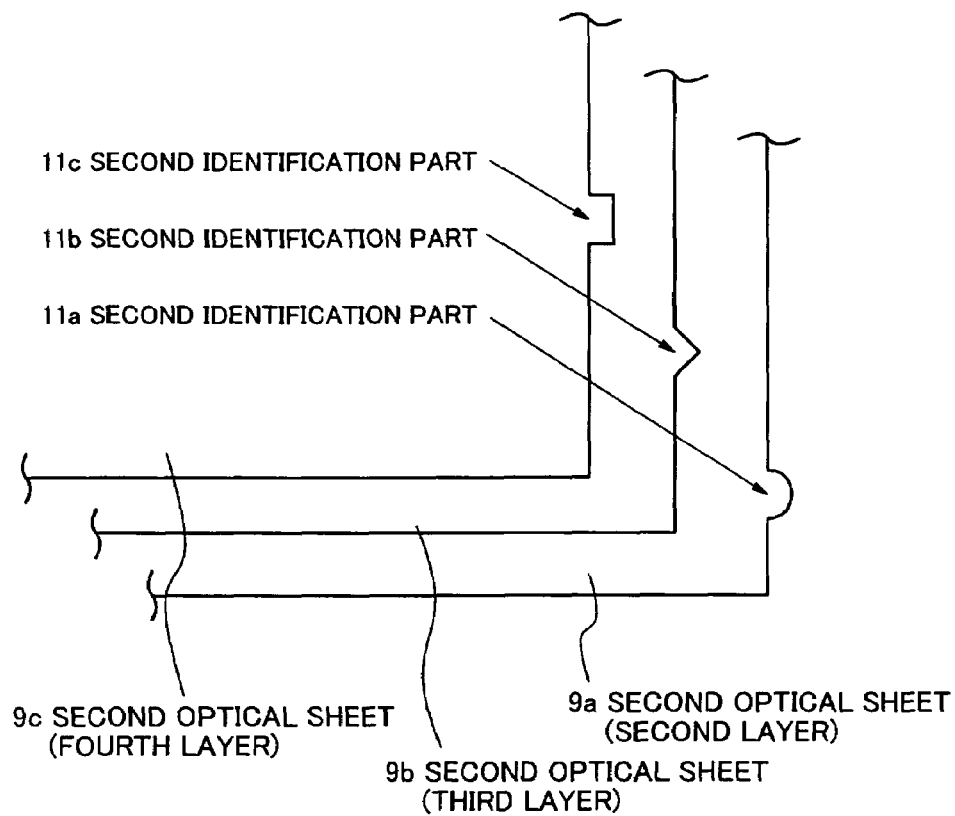
FIG. 11 is a plan view showing another structure of the second optical sheets related to the first embodiment of the present invention.

In FIGS. 4A to 4C, while all of the second identification parts 11a to 11c of the second optical sheets 9a to 9c are the same in size, for example, as shown in FIG. 9, the second identification parts 11a to 11c may be changed in size each other. In FIGS. 4A to 4C, while the second identification parts 11a to 11c are semicircular, the second identification parts 11a to 11c are optional in shape. For example, as shown in FIG. 10, they may be rectangular, trapezoidal, or triangular. As shown in FIG. 11, the second identification parts 11a to 11c may be structured by combining plural different types of shapes each other.

In the next place, a method of superposing the second optical sheets 9a to 9c on the first optical sheet 8 with the above structure is described with reference to FIGS. 5A and 5B. FIG. 5A shows the relationship between the first identification parts of the first optical sheet 8 and the second identification parts of the second optical sheets 9a to 9c. FIG. 5B shows the state where those optical sheets are superposed.

First, the first identification parts 10a to 10c are to be confirmed on the first optical sheet 8 at the lower right side of the sheet, thereafter, it is confirmed that the respective second optical sheets 9a to 9c are to be superposed in order of the first identification parts 10a, 10b and 10c.

Next, three second optical sheets 9a to 9c with the second identification parts 11a to 11c corresponding to the first identification parts 10a, 10b and 10c respectively are prepared (refer to FIG. 5A)

Then, the first optical sheet 8 is placed at the bottom layer, on which the second optical sheet 9a with the second identification part 11a corresponding to the first identification part 10a, the second optical sheet 9b with the second identification part 11b corresponding to the first identification part 10b and the second optical sheet 9c with the second identification part 11c corresponding to the first identification part 10c are superposed one on another in this order.

After the second optical sheets have been superposed, as shown in FIG. 5B, it is checked whether the first identification parts 10a, 10b and 10c are paired with the second identification parts 11a, 11b and 11c respectively and the second optical sheets 9a to 9c are placed without omission.

Figure 12:
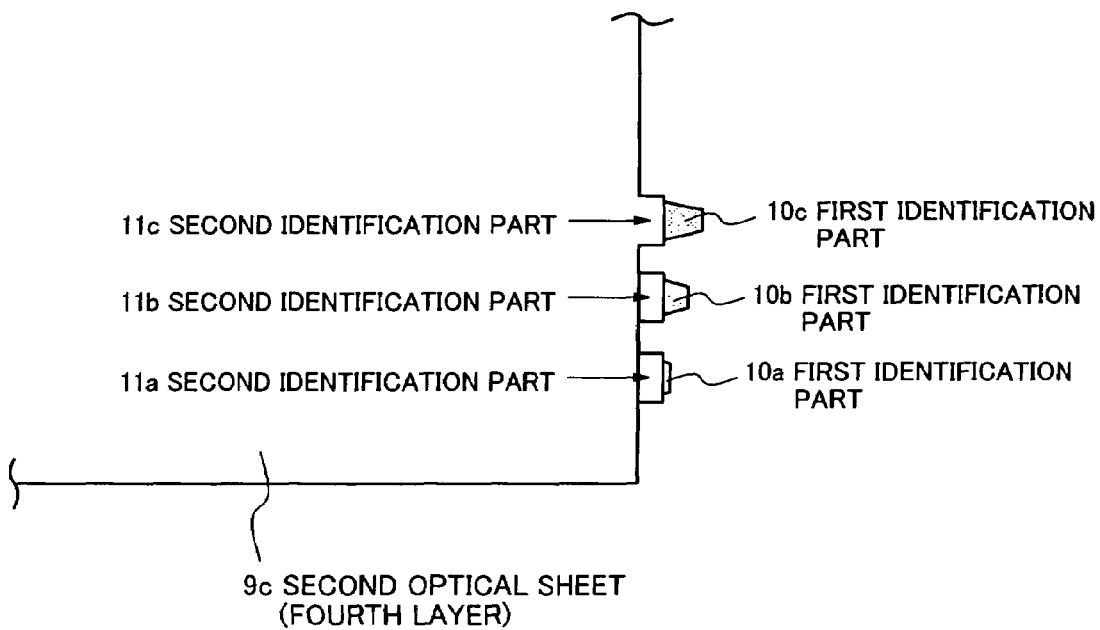
FIG. 12 is a plan view schematically showing the state where the second optical sheets with the structure shown in FIG. 10 are superposed on the first optical sheet with the structure shown in FIG. 3.

In FIGS. 5A and 5B, while the second identification parts 11a to 11c are arranged inside the first identification parts 10a to 10c when the second optical sheets 9a to 9c are superposed on the first optical sheet 8, it is enough structure in the present invention that at least a part of the first identification parts 10a to 10c can be visible from the periphery of the second identification parts 11a to 11c when superposed. For example, as shown in FIG. 12, as in the case of combining the first optical sheet 8 with a structure shown in FIG. 3 with the second optical sheets 9a to 9c with a structure shown in FIG. 10, the second identification parts 11a to 11c may partially protrude from the first identification parts 10a to 10c as long as at least a part of the first identification parts 10a to 10c can be visible.

Figure 13A:
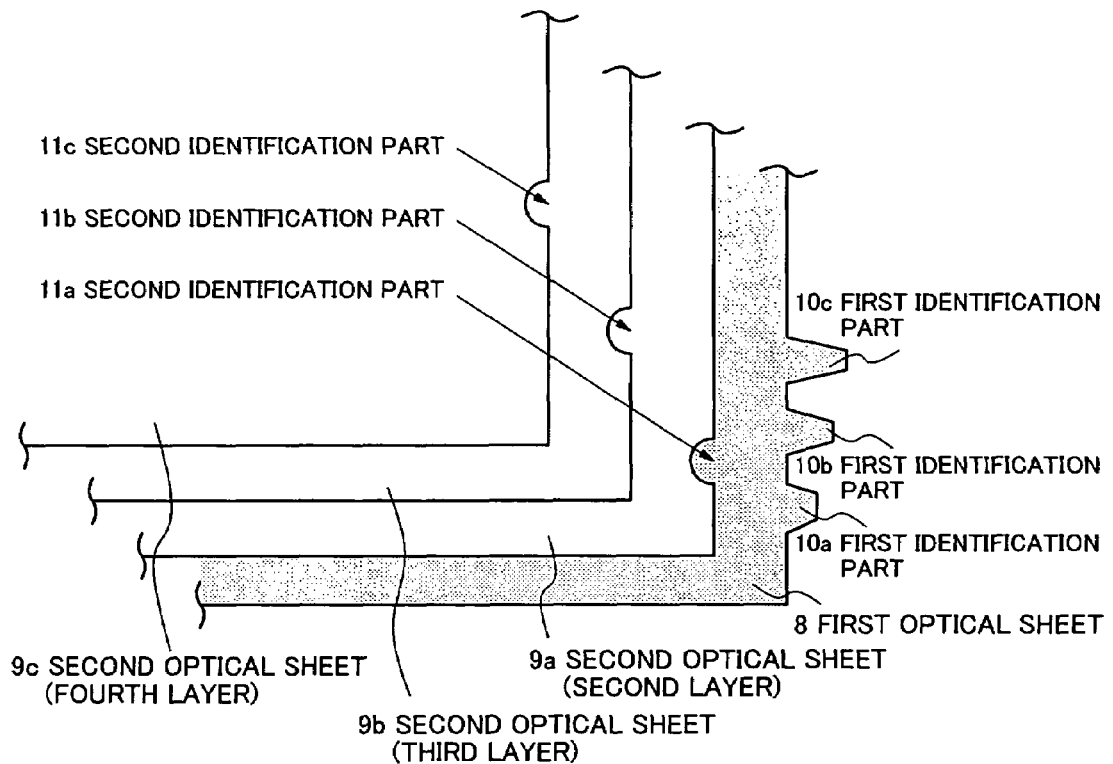
FIG. 13A is a plan view schematically showing the relationship between the first identification parts of the first optical sheet and the second identification parts of the second optical sheets with another structure, related to the first embodiment of the present invention.
Figure 13B:
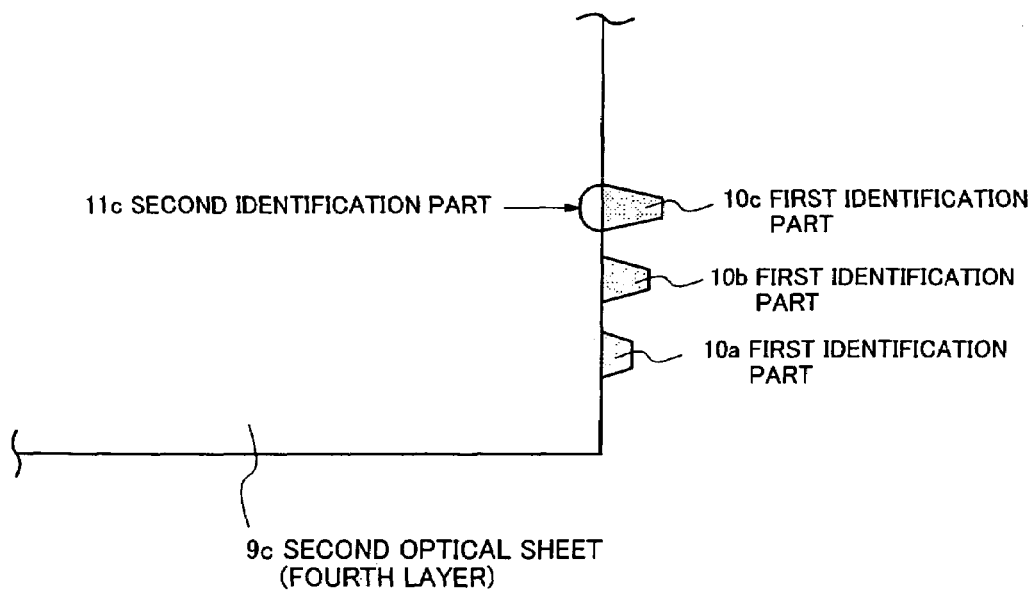
FIG. 13B is a plan view schematically showing the state where those optical sheets are superposed.
Figure 14A:
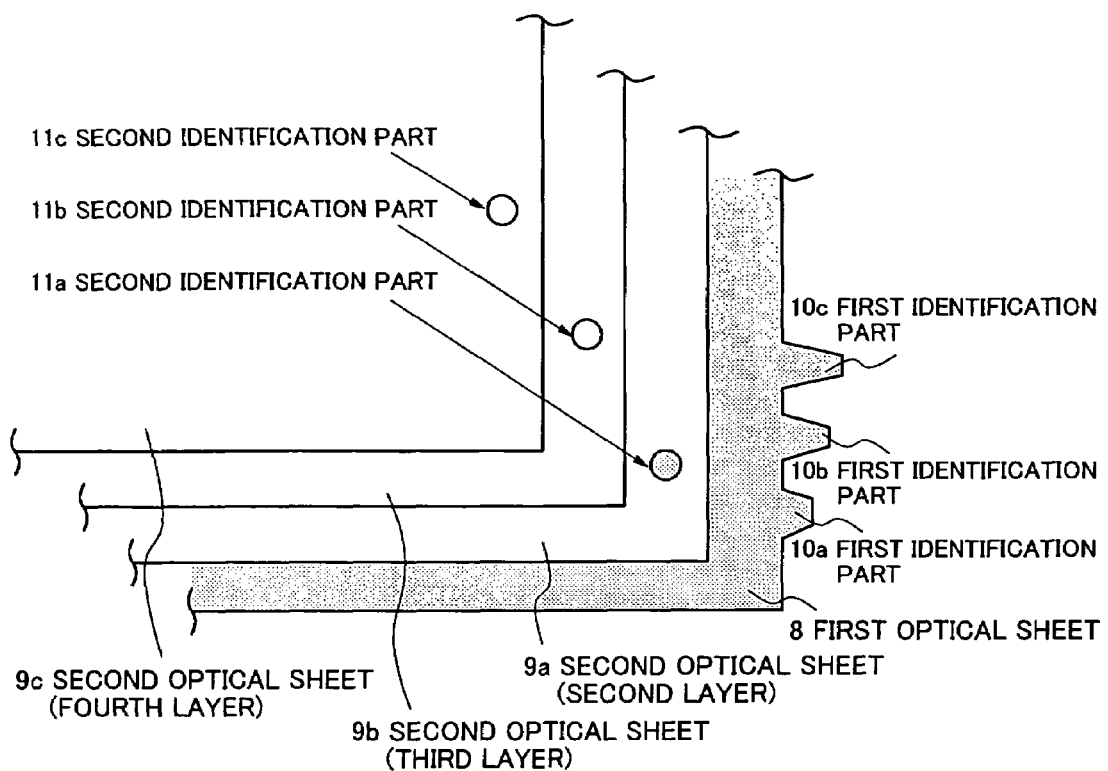
FIG. 14A is a plan view schematically showing the relationship between the first identification parts of the first optical sheet and the second identification parts of the second optical sheets with another structure, related to the first embodiment of the present invention.
Figure 14B:
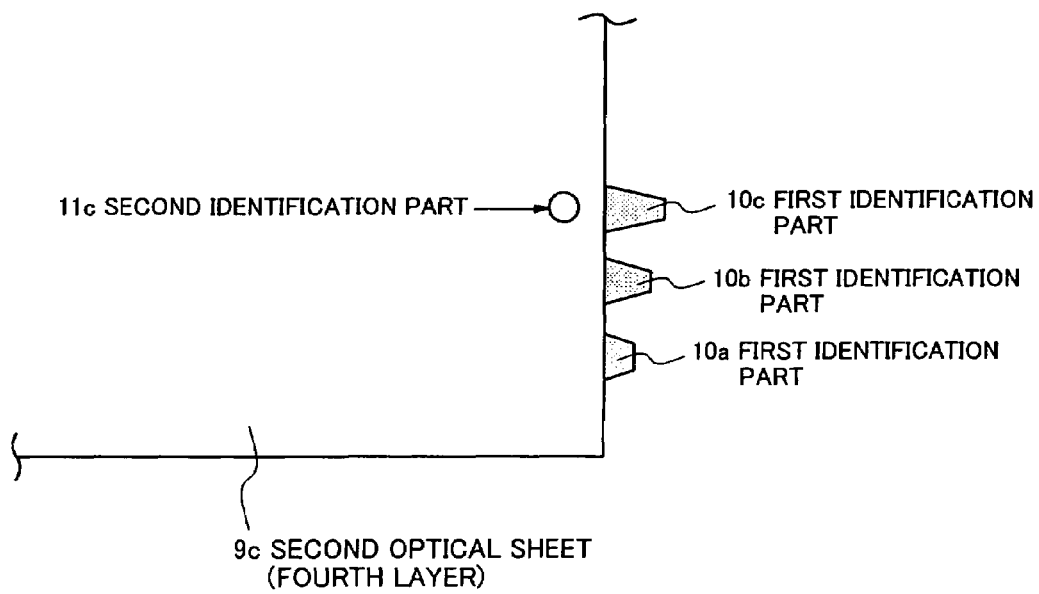
FIG. 14B is a plan view schematically showing the state where those optical sheets are superposed.

Furthermore, the second identification parts 11a to 11c may associate the first optical sheet 8 with each of the second optical sheets 9a to 9c. Each of the second optical sheets 9a to 9c can be identified when superposed by the association of each of the second identification parts 11a to 11c with the first optical sheet 8. For that reason, in FIGS. 5A and 5B and FIGS. 9 to 11, the second identification parts 11a to 11c are convex parts, but may be concave parts as shown in FIGS. 13A and 13B, furthermore, may be hole parts as shown in FIGS. 14A and 14B. In this case, the concave and hole parts are optional in shape, which means that the concave part may be rectangular, trapezoidal, triangular, or the like and the hole part may be oval, rectangular, or the like. In addition, two different kinds of parts, e.g., the concave and hole parts may be combined with each other. Three different kinds of parts, e.g., convex, concave and hole parts may be combined with each other.

Figure 15A:
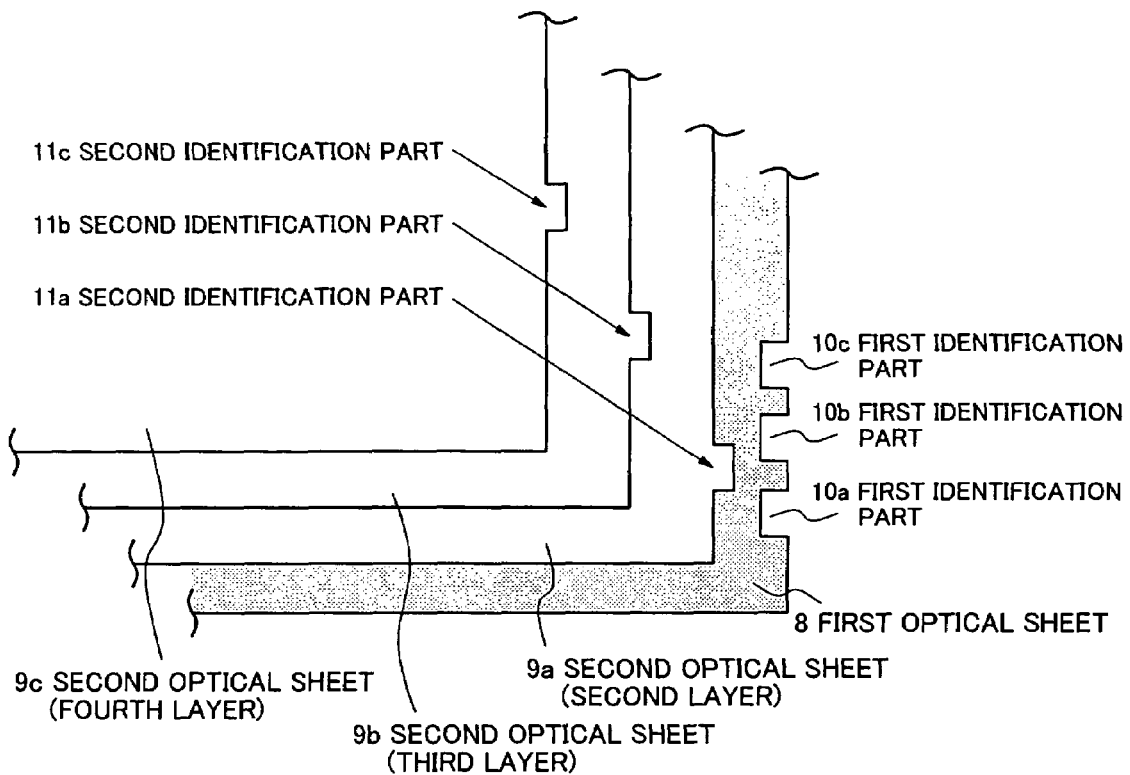
FIG. 15A is a plan view schematically showing the relationship between the first-identification parts of the first optical sheet with another structure and the second identification parts of the second optical sheets with another structure, related to the first embodiment of the present invention.
Figure 15B:
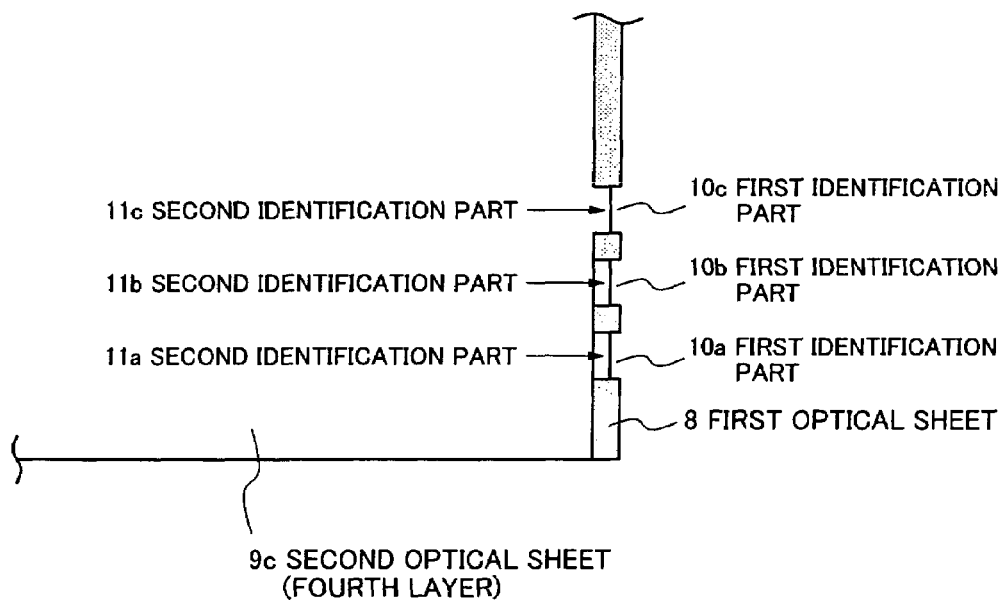
FIG. 15B is a plan view schematically showing the state where those optical sheets are superposed.
Figure 16A:
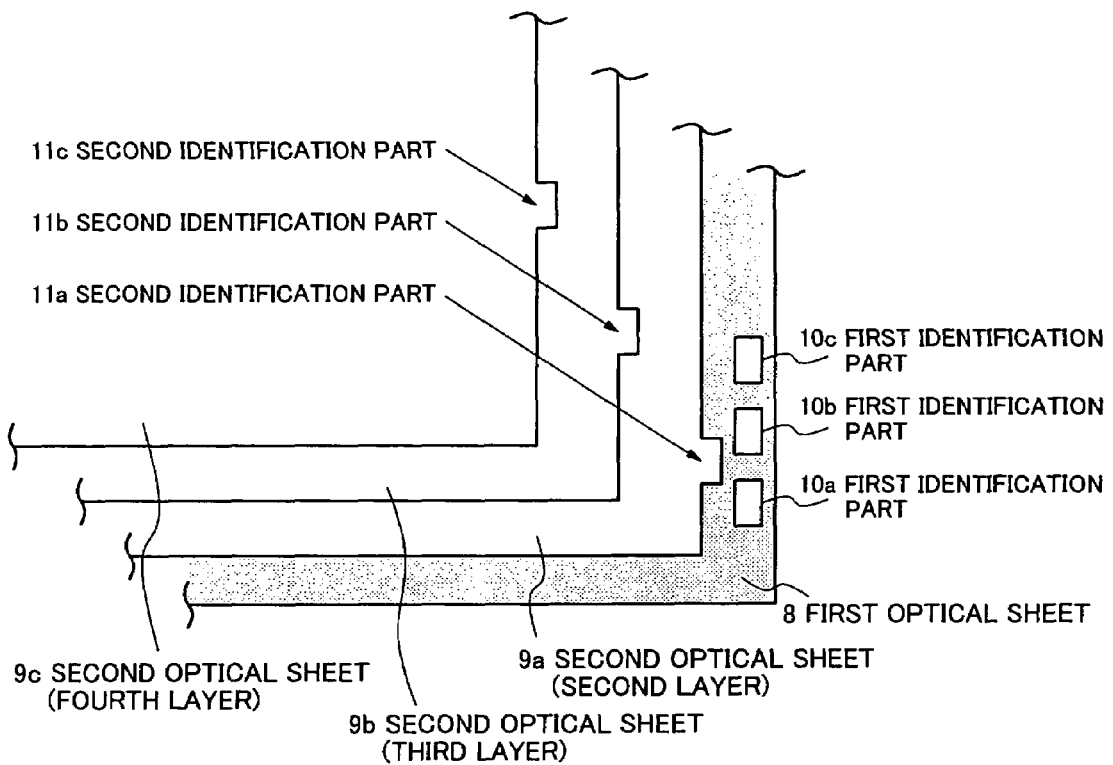
FIG. 16A is a plan view schematically showing the relationship between the first identification parts of the first optical sheet with another structure and the second identification parts of the second optical sheets with another structure, related to the first embodiment of the present invention.
Figure 16B:
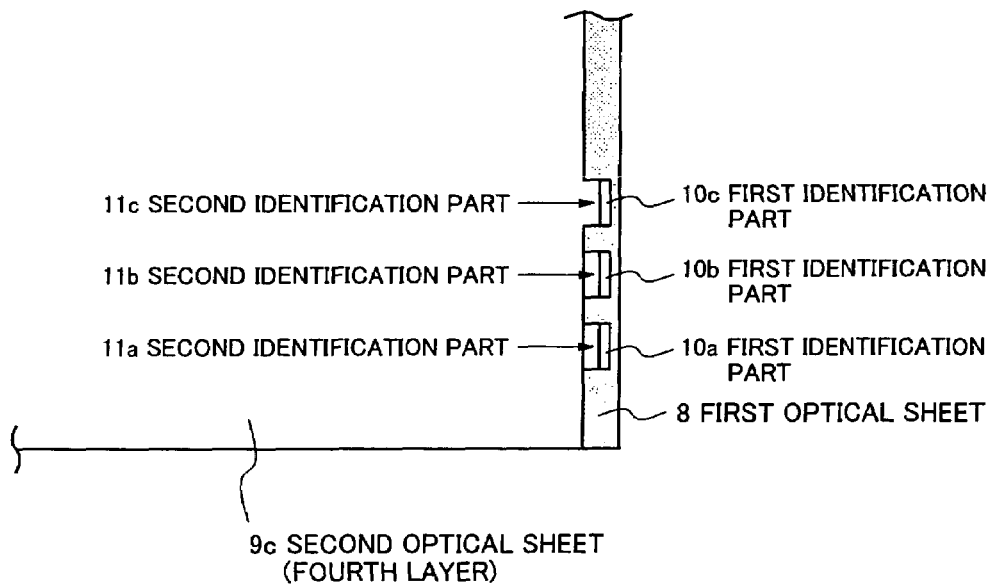
FIG. 16B is a plan view schematically showing the state where those optical sheets are superposed.

As is the case with the second identification parts 11a to 11c, the first identification parts 10a to 10c may associate the first optical sheet 8 with the respective second optical sheets 9a to 9c. For this reason, in FIGS. 5A and 5B, FIGS. 7A and 7B and FIGS. 8A and 8B, the first identification parts 10a to 10c are convex parts, but may be concave part as shown in FIGS. 15A and 15B or may be hole parts as shown in FIGS. 16A and 16B.

Incidentally, when the first identification parts 10a to 10c are structured by concave or hole parts, if the first optical sheet 8 is equal to the second optical sheets 9 in breadth, the first identification parts 10b and 10c are covered with the second optical sheets 9a when the second optical sheet 9a is superposed on the first optical sheet 8, which does not enable the first optical sheet 8 to be associated with the second optical sheets 9b and 9c when the second optical sheets 9b and 9c are assembled afterward. Therefore, when the first identification parts 10a to 10c are structured by concave or hole parts, the second optical sheets 9a to 9c need to be narrowed in breadth not to cover over the first identification parts 10a to 10c.

Incidentally, the concave and hole parts are optional in shape. The concave part may be semicircular, trapezoidal, triangular or the like. The hole part may be circular, oval or the like. Two different kinds of parts, e.g., the concave and hole parts may be combined with each other. Three different kinds of parts, e.g., convex, concave and hole parts may also be combined with each other. Any shape may be used as long as at least a part of the second identification parts 11a to 11c and the first identification parts 10a to 10c are visually recognizable.

As described above, in the present embodiment, the first optical sheet 8 serving as a reference sheet is sequentially associated with each of the second optical sheets 9a to 9c. That is, the first identification parts 10a to 10c provided on the first optical sheet 8 keep the sequential association with each of the second identification parts 11a to 11c provided on each second optical sheet 9a to 9c. For this reason, in the present invention, the optical sheets 7 continuing upward and downward are not sequentially associated with each other, unlike conventional examples, so that even if a part of the optical sheets 7 is changed in structure, the other optical sheets 7 is capable of flexibly coping with the change. In the following, concrete examples are described with reference to the drawings.

Figure 17A:
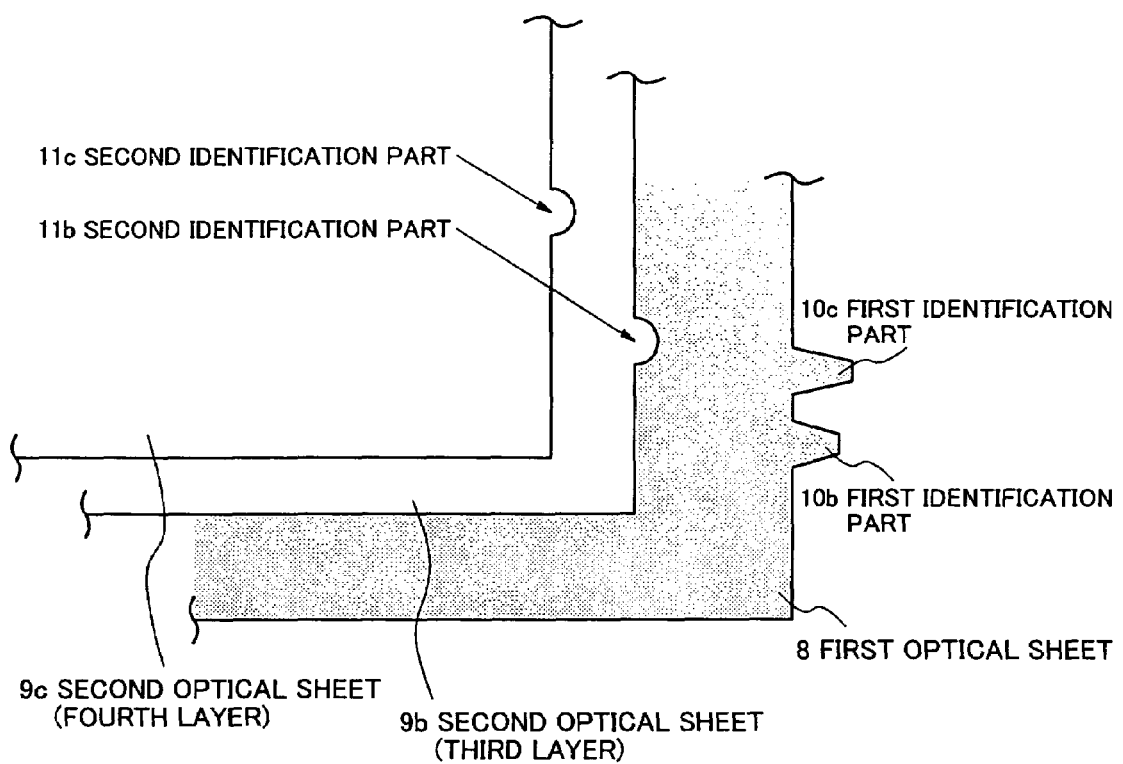
FIG. 17A is a plan view schematically showing the relationship between the first identification parts of the first optical sheet and the second identification parts of the second optical sheets for a case where a part of the second optical sheets is removed in the first embodiment of the present invention.
Figure 17B:
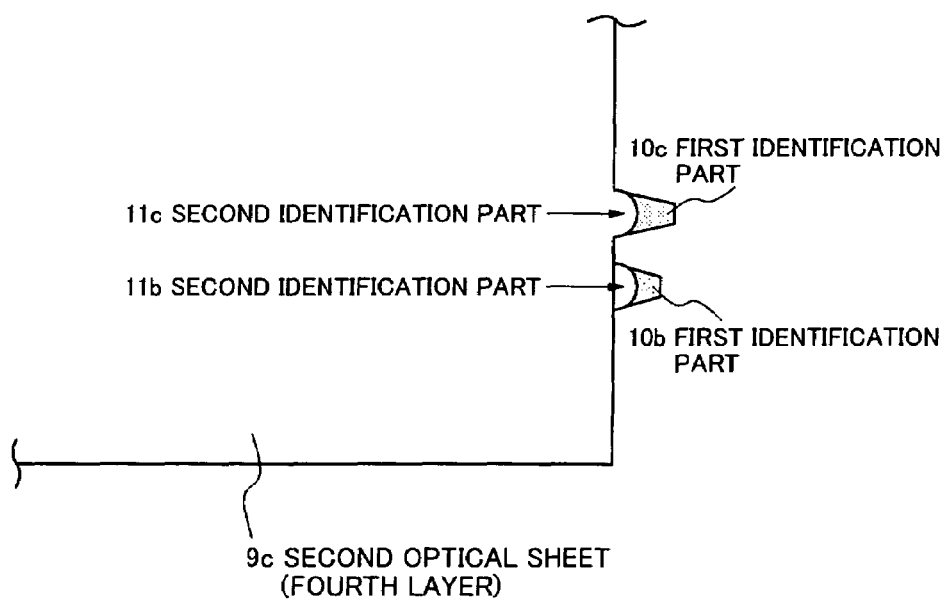
FIG. 17B is a plan view schematically showing the state where those optical sheets are superposed.

First, in the structure of FIGS. 5A and 5B, when a part of the second optical sheets 9 (for example, the second optical sheet 9a, i.e., the second layer from the bottom) is to be removed due to revision of specifications of an apparatus, for example, since the optical sheets continuing upward and downward have been sequentially associated with each other in the conventional structure, all the optical sheets placed afterward the removed optical sheet should have been replaced by new optical sheets. In the present embodiment, however, the second optical sheet 9a is not associated with other second optical sheets 9b and 9c, and each of the second optical sheets 9a to 9c is associated only with the first optical sheet 8. For this reason, as shown in FIGS. 17A and 17B, the second optical sheets 9b and 9c can remain as they are (no need to be replaced by new optical sheets), and only the first optical sheet 8 may be replaced by new optical sheet instead. That is, it may be necessary to remove the corresponding first identification part 10a on the first optical sheet to cope with the removal of the second optical sheet 9a. Thus, the influence on the other optical sheets can be reduced as much as possible even when a part of the second optical sheets 9 is removed.

Figure 18A:
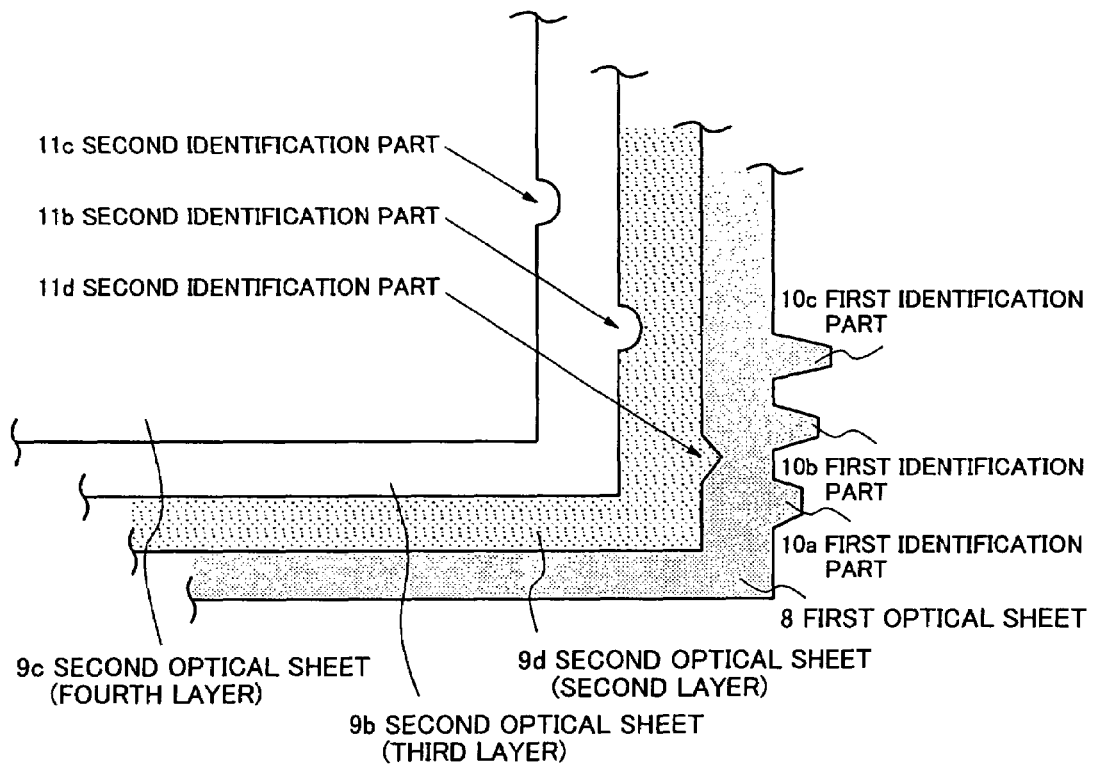
FIG. 18A is a plan view schematically showing the relationship between the first identification parts of the first optical sheet and the second identification parts of the second optical sheets for a case where a part of the second optical sheets is replaced by a new optical sheet in the first embodiment of the present invention.
Figure 18B:
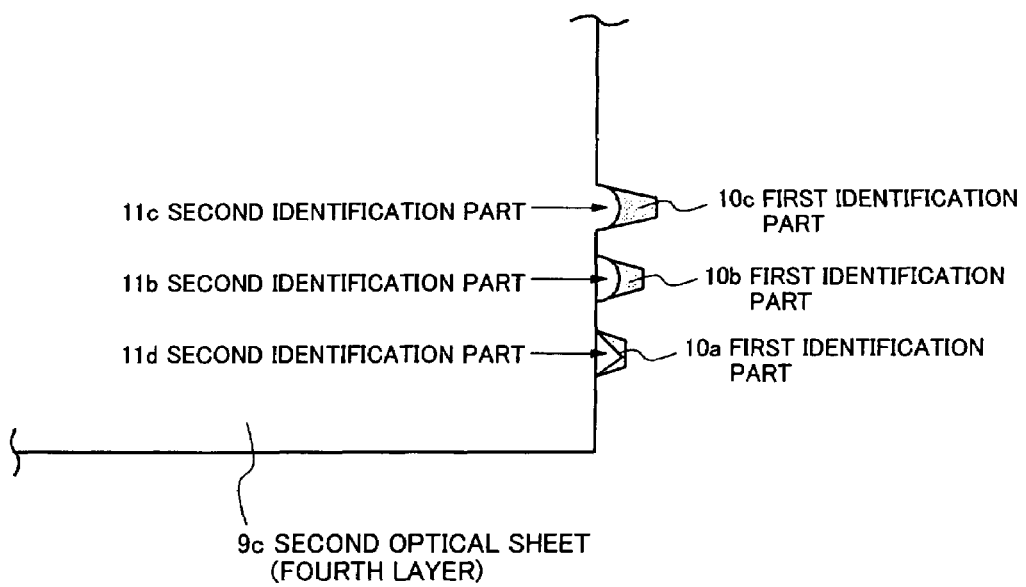
FIG. 18B is a plan view schematically showing the state where those optical sheets are superposed.

In the structure of FIGS. 5A and 5B, when a part of the second optical sheets 9 (for example, the second optical sheet 9a, i.e., the second layer from the bottom) is to be replaced by new optical sheet due to revision of specifications of the apparatus, since all the optical sheets continuing upward and downward are sequentially associated with each other in the conventional structure, the old replaced optical sheet and the new replacing optical sheet should be the same in shape to keep current association among the optical sheets (i.e., association between the old replaced optical sheet and rest of the remaining optical sheets placed on and beneath the old replaced optical sheet is still to be kept), and a second identification part 11a formed on the new replacing optical sheet should be the same in shape and place as those formed on the old replaced optical sheet. This has caused confusion in that the new replacing optical sheet cannot be discriminated from the old replaced optical sheet. However, in the present embodiment, as shown in FIGS. 18A and 18B, the second identification part 1id different in position and shape from that of the old replaced second optical sheet 9a can be formed on the new replacing second optical sheets 9d. If the second identification part 1id is formed in a different position on the new replacing second optical sheets 9d, the first optical sheet 8 may also be replaced. That is, it may be necessary to modify the position of the corresponding first identification part 10a on the first optical sheet 8 to cope with the new second optical sheet 9a on which the second identification part 1id is formed in a different position. For this reason, even if a part of the optical sheets 9 is replaced, the old replaced second optical sheet can be discriminated from the new replacing second optical sheet.

Thus, in the present embodiment, one of a plurality of the optical sheets 7 is treated as the first optical sheet 8 as a reference sheet, the rest of optical sheets 7 placed following the first optical sheet when assembled are treated as the second optical sheets 9, the first identification parts 10 of the same number as the second optical sheets 9 are provided on the first optical sheet 8 and allocated by the predetermined order to specify each of the layer positions for the respective second optical sheets, and the second identification parts 11 each corresponding to the respective first identification parts 10 are provided on the second optical sheets 9 based on the layer position to be placed, thereby associating the first optical sheet 8 with each of the second optical sheet 9 (which means that the second optical sheets 9 are not associated with each other). Thus, the present embodiment allows a plurality of the optical sheets 7 to be simply and surely placed in an appropriate order and direction and flexibly coping with the removal of the optical sheet 7 and change in structure thereof.

Second Embodiment

A backlight unit, a liquid crystal display apparatus equipped with the backlight unit and a method of assembling the backlight unit related to the second embodiment of the present invention are described with referring to FIG. 19 through FIGS. 23A to 23E.

Figure 19:
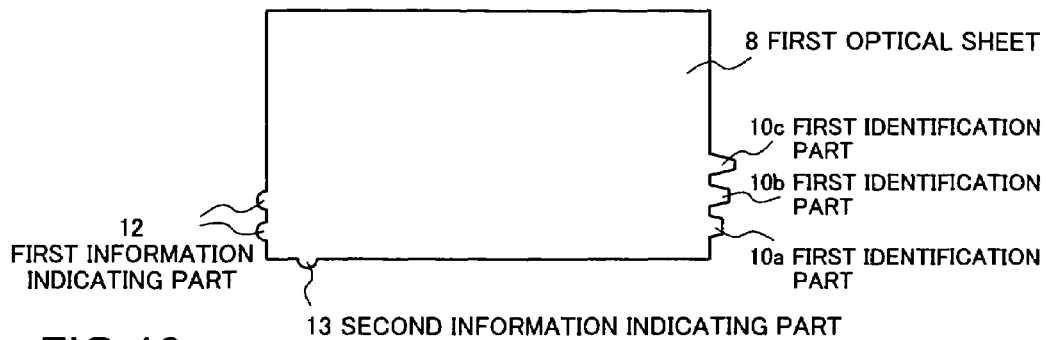
FIG. 19 is a plan view schematically showing the structure of a first optical sheet related to a second embodiment of the present invention.
Figure 20A:
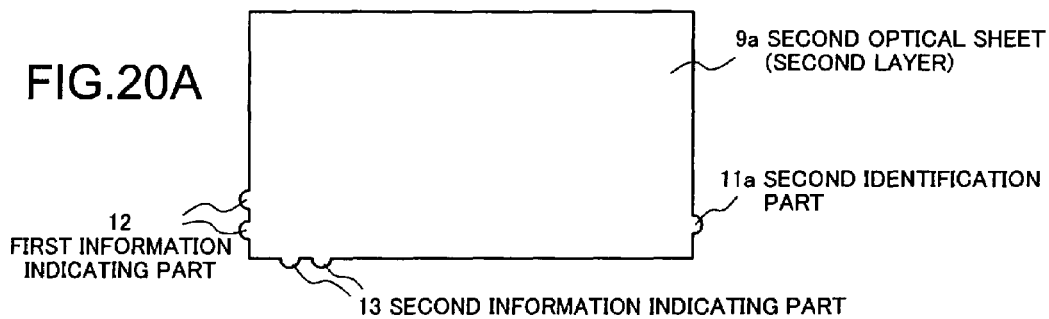
FIGS. 20A to 20C are plan views schematically showing the structure of respective second optical sheets related to the second embodiment of the present invention.
Figure 20B:
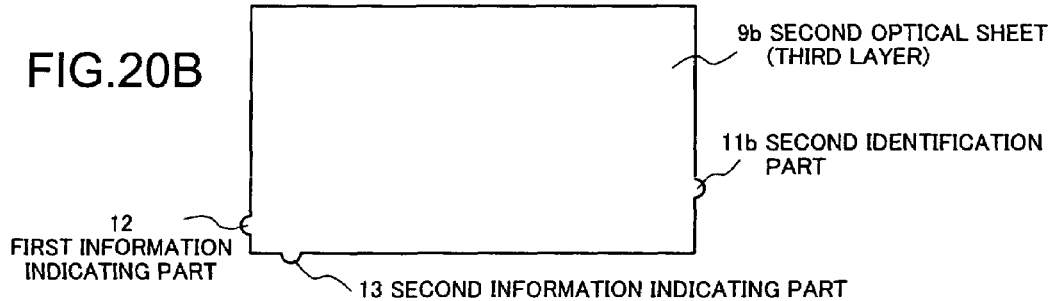
Figure 20C:
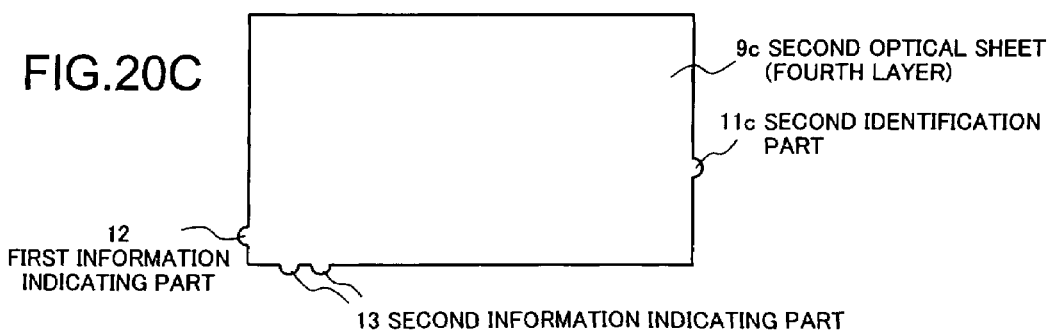

FIG. 19 shows a schematic structure of the first optical sheet related to the present embodiment and FIGS. 20A to 20C show the schematic structures of the second optical sheets. FIGS. 21A and 21B through FIGS. 23A to 23E show the schematic structures for applications and modification examples of the present embodiment.

In the above first embodiment, the first identification parts 10a to 10c are provided on the first optical sheet 8 and the second identification parts 11a to 11c are provided on the second optical sheets 9a to 9c, thereby pairing the first identification parts 10a to 10c with the second identification parts 11a to 11c to simply and surely place a plurality of the optical sheets 7 in an appropriate order and direction. However, as described in the part of the related art herein, the optical sheets 7 are visually indistinguishable in function, manufacturer's name, revision number, thickness and others thereof from appearances. For this reason, hitherto, specifications had to be referred to each time for discriminating and identifying each optical sheet, which caused a problem in that the assembling work efficiency is decreased.

In the present embodiment, as shown in FIG. 19 and FIGS. 20A to 20C, information indicating parts showing information on each of the optical sheets such as function, manufacturer's name, revision number, thickness and others are provided in a position (at a lower part on the left side of the sheet and the bottom thereof) aside from the positions where the first identification parts 10a to 10c and the second identification parts 11a to 11c of the first optical sheet 8 and the second optical sheets 9a to 9c are located respectively.

As shown in the figure, for example, a first information indicating part 12 is arranged on the left side of each of the optical sheets 7 and is used as an index showing manufacturer's name. The number of convex parts is associated with manufacturer's name, for example, one convex part refers to Company A, two convex parts to Company B, and so forth. In addition, a second information indicating part 13 is arranged on the bottom of each of the optical sheets 7 and is used as an index showing the revision number of the optical sheet. The number of convex parts is associated in advance with the revision number, for example, one convex part refers to the first revision, two convex parts to the second revision, and so forth.

Thus, merely checking the first information indicating part 12 and the second information indicating part 13 provides information on the optical sheet 7 without need for reference to specifications, the information indicating that, for example, the first optical sheet 8 is produced by Company B and is the first revision, the second optical sheet 9a of the second layer is produced by Company B and is the second revision, and the second optical sheet 9b of the third layer is produced by Company A and is the first revision. This allows the optical sheets 7 to be discriminated and identified.

Incidentally, while the first information indicating part 12 and the second information indicating part 13 are provided on all the optical sheets 7 herein, the information indicating part may be formed on at least one of the optical sheets 7.

Furthermore, while the first information indicating part 12 and the second information indicating part 13 are associated with manufacturer's name and revision number herein, the information indicating part may indicate any information on the optical sheet 7. The number of kinds of information is not limited to two, but can be optionally set. The information indicating part may be provided according to a desired number.

Still furthermore, while the number of the first information indicating parts 12 and the second information indicating parts 13 are associated with contents of information, the size of the first information indicating part 12 and the second information indicating part 13 may be associated with contents of information, for example, or the first information indicating part 12 and the second information indicating part 13 may be formed of a plurality of shapes such as rectangle, trapezoid, triangle and the like to associate the kinds of shapes with contents of information.

Figure 21A:
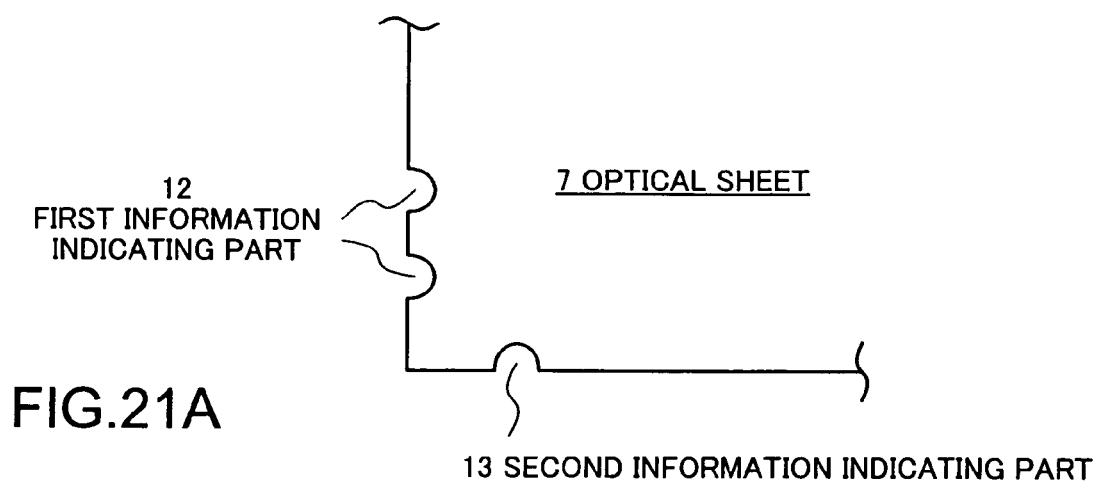
FIGS. 21A and 21B are plan views showing another structure of an optical sheet related to the second embodiment of the present invention.
Figure 21B:
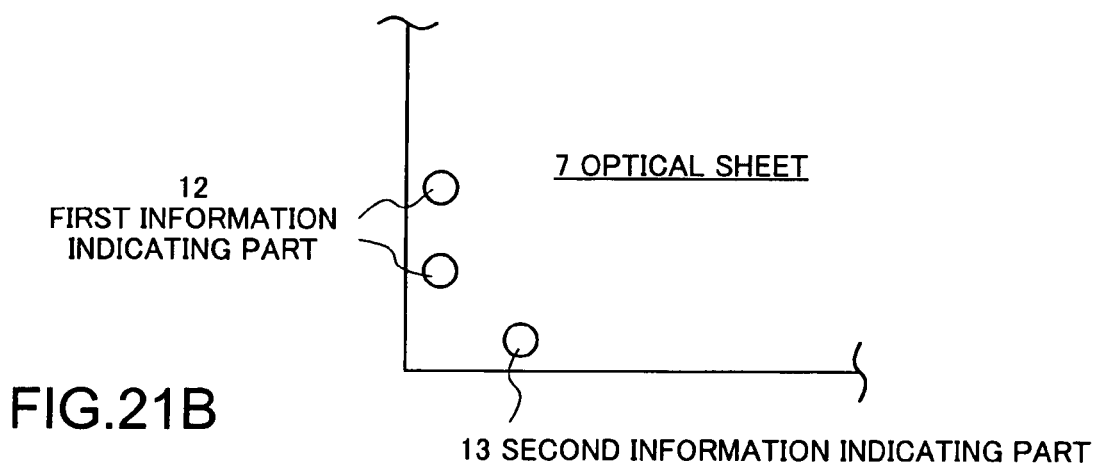

Still furthermore, in FIG. 19 and FIGS. 20A to 20C, while the first information indicating part 12 and the second information indicating part 13 are formed of convex parts, these information indicating parts are intended for providing information on the optical sheets 7, so that information does not always need to be checked on a condition where the optical sheets 7 having been superposed. For this reason, as shown in FIGS. 21A and 21B, a convex part or hole part may be used instead of the convex part.

Figure 22A:
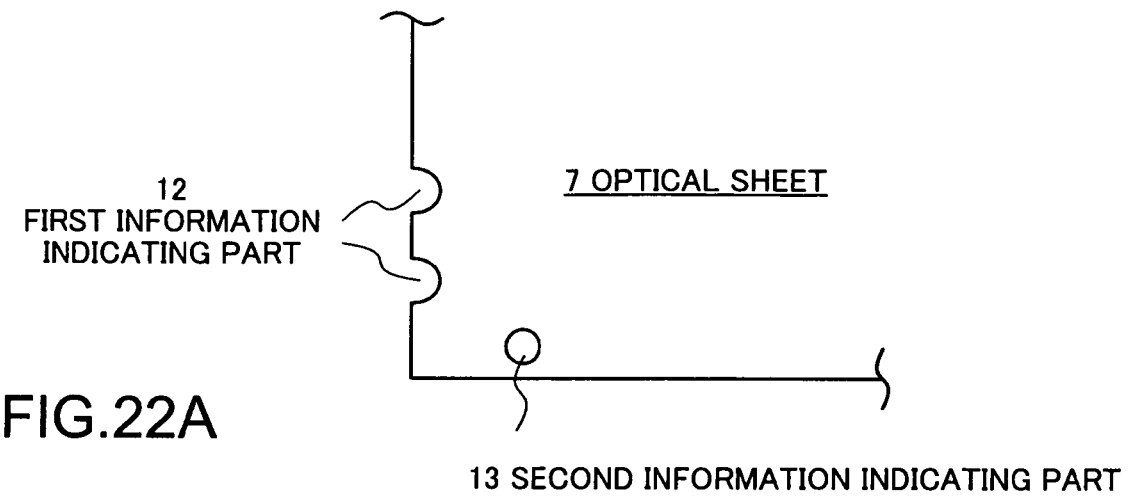
FIGS. 22A and 22B are plan views showing another structure of an optical sheet related to the second embodiment of the present invention.
Figure 22B:
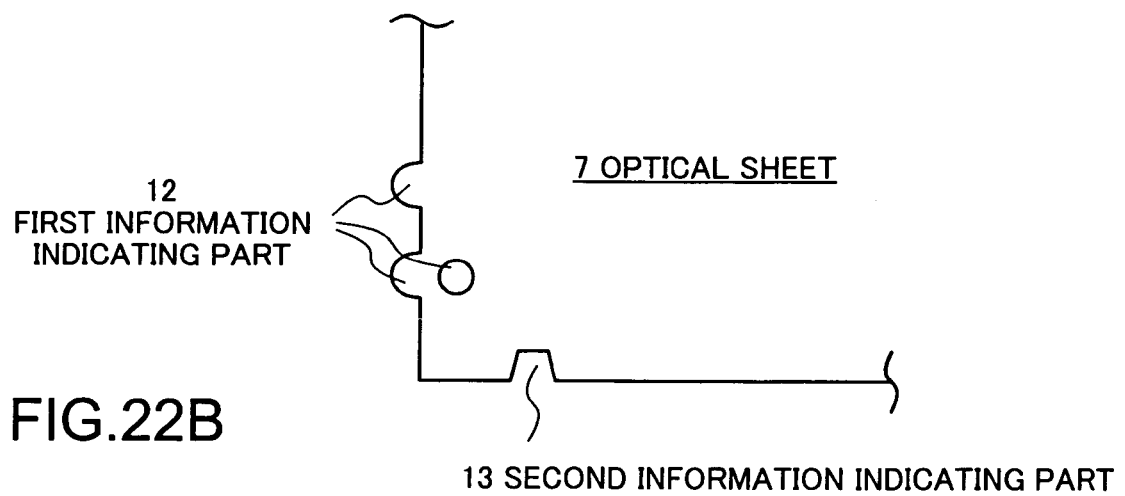

In this case, the concave and hole parts are optional in shape, which means that the concave part may be rectangular, trapezoid, triangular or the like and the hole part may be oval, rectangular or the like. In addition, two different kinds of parts, e.g., the concave and hole parts may be combined with each other as shown in FIG. 22A. Three different kinds of parts, e.g., convex, concave and hole parts may be combined with each other as shown in FIG. 22B.

Figure 23A:
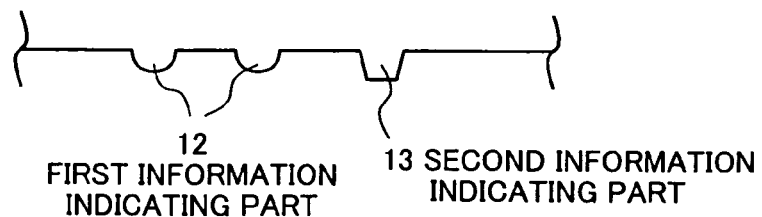
FIGS. 23A to 23E are plan views showing another structure of an optical sheet related to the second embodiment of the present invention.
Figure 23B:
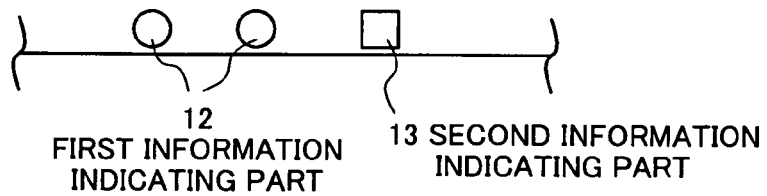

In FIG. 19 through FIGS. 22A to 22B, while the first information indicating part 12 is provided at the left side and the second information indicating part 13 is provided at the bottom, the information indicating part may be provided anywhere. For example, all the information indicating parts may be provided at the bottom. In this case, however, if the first information indicating part 12 and the second information indicating part 13 are the same in shape, they are indistinguishable. Therefore, as shown in FIG. 23A, the first information inciting part 12 may be changed in shape into semicircular convex and the second information indicating part 13 into trapezoidal convex for example. Alternatively, as shown in FIG. 23B, the first information indicating part 12 may be changed in shape into circular hole and the second information indicating part 13 into rectangular hole for example.

Figure 23C:
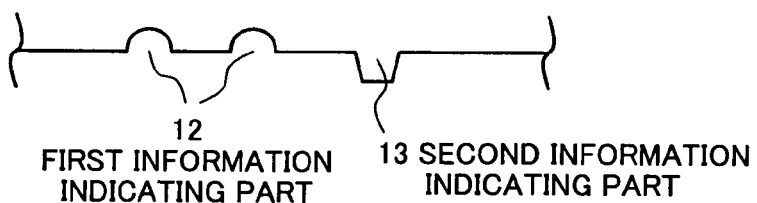
Figure 23D:
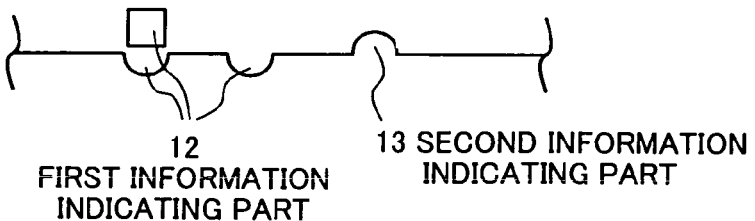

As shown in FIG. 23C, the first information indicating part 12 may be changed in shape into semicircular concave and the second information indicating part 13 into trapezoidal convex for example. Alternatively, as shown in FIG. 23D, convex, concave and hole may be combined, for example, the first information indicating part 12 may be changed in shape into semicircular convex and rectangular hole and the second information indicating part 13 into semicircular concave.

Figure 23E:
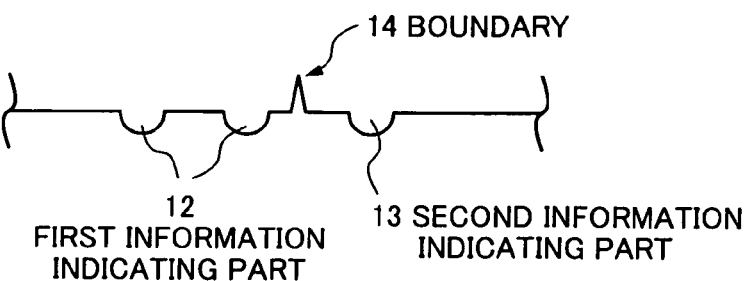
Figure 24A:
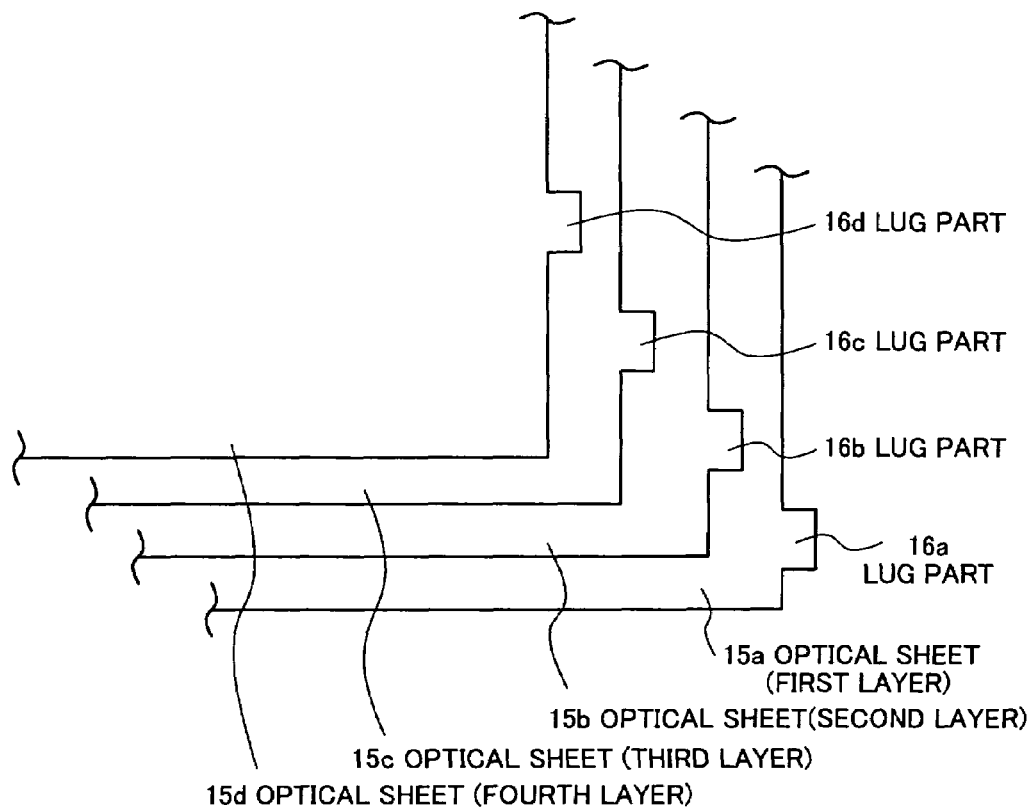
FIG. 24A is a plan view schematically showing the state where lug parts so formed as to shift in position from each other and as to partially and sequentially superposed on each other are provided on the four conventional optical sheets.
Figure 24B:
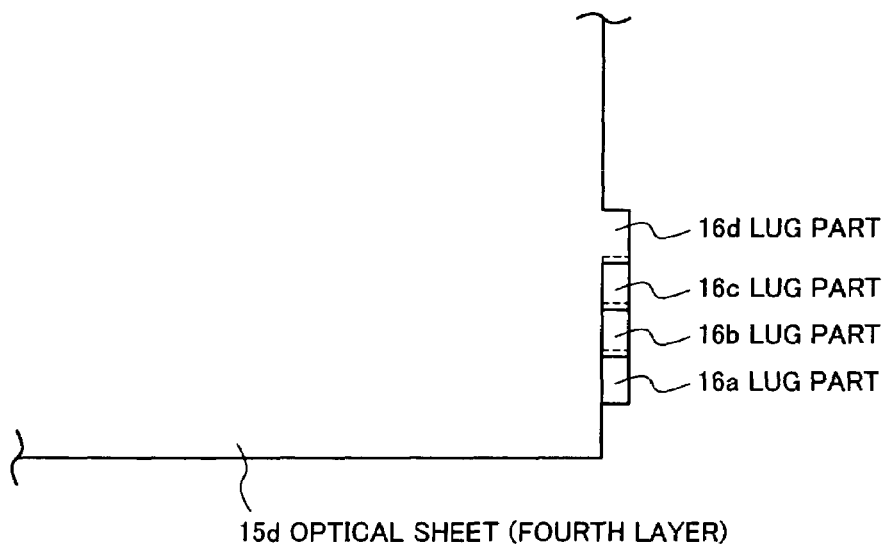
FIG. 24B is a plan view schematically showing the state where all of the four conventional optical sheets are superposed.
Figure 25A:
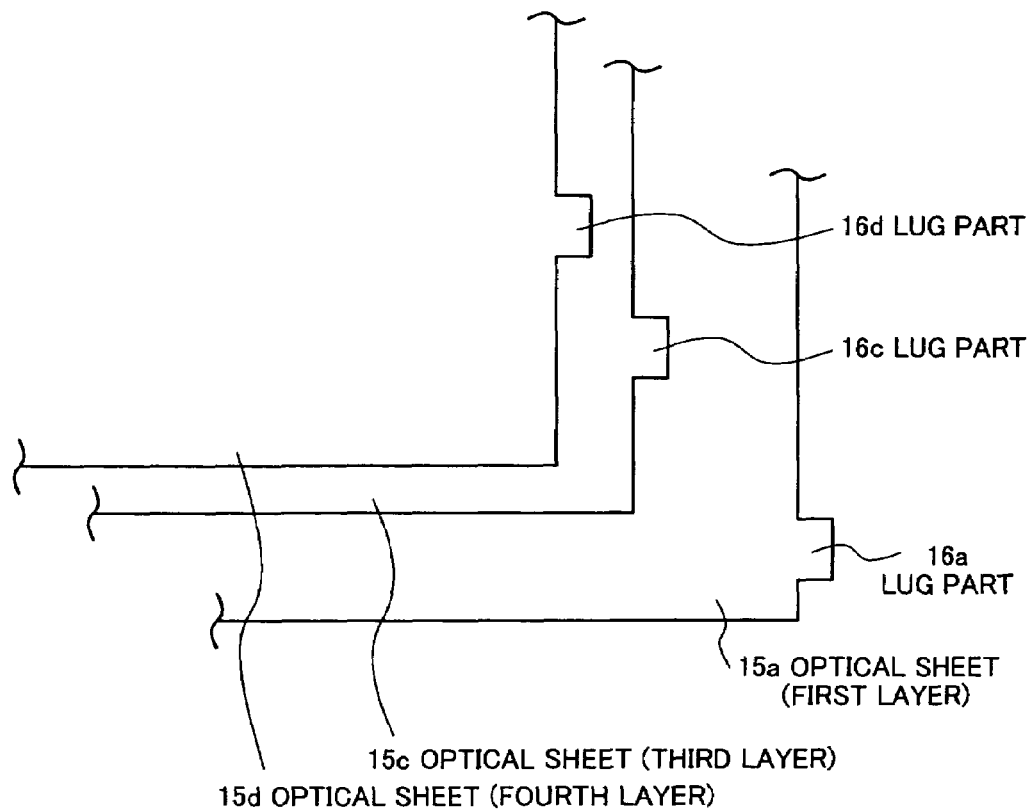
FIG. 25A is a plan view schematically showing the state where out of the four conventional optical sheets the second-layer optical sheet is removed.
Figure 25B:
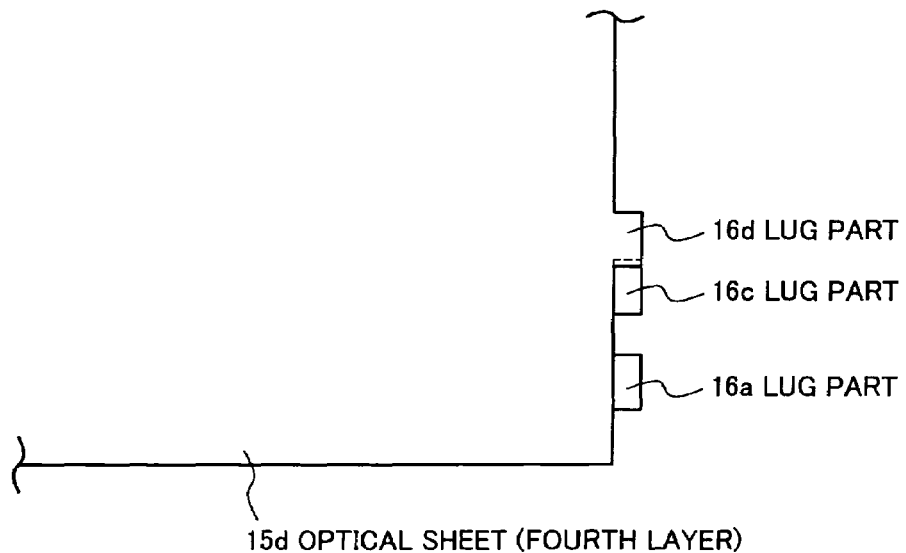
FIG. 25B is a plan view schematically showing the state where the other three optical sheets left after the second-layer optical sheet has been removed are superposed.

Instead of changing the first information indicating part 12 and the second information indicating part 13 in shape and kind, as shown in FIG. 23E, a mark indicating a boundary 14 may be provided to separate the first information indicating part 12 from the second information indicating part 13. In this case, the mark indicating a boundary 14 is not limited to the structure shown in the figure, but may be changed into, for example, a hole part formed between the first information indicating part 12 and the second information indicating part 13.

As stated above, according to the second embodiment of the present invention, an information indicating part (the first information indicating part 12 and the second information indicating part 13) for indicating information on manufacturer's name, revision number, thickness and others of the optical sheet 7 in addition to the first identification part 10 and the second identification part 11 shown in the first embodiment is provided on at least one optical sheet 7, thereby obtaining contents of information from the number, shape and position of the information indicating part. Thus, each of the optical sheets 7 can be identified without referring to specifications each time unlike conventional examples, which enables improving work efficiency.

Incidentally, while the above embodiments have described the cases where the structure and method of the present invention are applied to the backlight unit, the present invention can be applied also to any apparatus into which a plurality of optical sheets require to be assembled in an appropriate order and arrangement.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. A backlight unit equipped with at least a light source, a plurality of optical sheets and a chassis into which at least the plurality of optical sheets are assembled by placing each optical sheet in proper order and direction, the backlight unit comprising:

a first optical sheet, which is one of the plurality of optical sheets, and provided with first identification parts at predetermined positions around the periphery thereof, wherein a number of the first identification parts is a same number as a rest of the plurality of optical sheets other than the first optical sheet; and a plurality of second optical sheets, which are the rest of the plurality of optical sheets other than the first optical sheet and to be placed following the first optical sheet in proper layer positions and direction when assembled into the chassis, and each of the second optical sheets being provided with a second identification part at a position corresponding to one of the first identification parts, wherein each of the first identification parts is allocated in predetermined order to specify a layer position where each of the second optical sheets is placed, the second identification part is so shaped that at least a part of the corresponding first identification part is visually recognizable when viewed from an assembling direction of the plurality of optical sheets.

2. The backlight unit according to claim 1, wherein at least one of the optical sheets is provided with an information indicating part for indicating information on the optical sheet at a position different from positions where the first and the second identification parts are located.

3. The backlight unit according to claim 2, wherein the information on the optical sheet includes any one of a characteristic, a manufacturer's name, a revision number, and a thickness thereof.

4. The backlight unit according to claim 2, wherein the information indicating part is different in at least one of a quantity, a shape and a position according to the contents of the information on the optical sheet.

5. The backlight unit according to claim 1, wherein the first and the second identification parts each are formed of at least one of a convex, a concave and a hole part.

6. The backlight unit according to claim 2, wherein the first and the second identification parts and the information indicating part each are formed of at least one of a convex, a concave and a hole part.

7. The backlight unit according to claim 1, wherein the first identification parts are different each other in at least one of a size and a shape.

8. The backlight unit according to claim 1, wherein the second identification part and corresponding one of the first identification parts are different each other in at least one of a size and a shape.

9. The backlight unit according to claim 1, wherein the first optical sheet is placed on a top layer or a bottom layer of the plurality of optical sheets depending on the assembling direction of the plurality of optical sheets.

10. A liquid crystal display apparatus comprising a liquid crystal panel and the backlight unit according to claim 1.

11. A method of assembling a backlight unit equipped with a light source, a plurality of optical sheets, and a chassis into which at least the plurality of optical sheets are assembled, in which one of the plurality of optical sheets placed at a prescribed layer is treated as a first optical sheet and rest of the plurality of optical sheets placed following the first optical sheet are treated as second optical sheets, the method comprising:

providing first identification parts of a same number as the second optical sheets at prescribed positions around the periphery of the first optical sheet in predetermined order, so as each of the first identification parts to specify a layer position where each of the second optical sheets is to be placed;

providing a second identification part, on each of the second optical sheets, at a position corresponding to one of the first identification parts based on the layer position where the second optical sheet is to be placed; and placing the first optical sheet, and then superposing each of the second optical sheets so that each of the first identification parts is paired with the second identification part corresponding to the layer specified by the first identification part.

12. The method of assembling the backlight unit according to claim 11, wherein the providing a second identification part includes forming the second identification part with a shape that at least a part of the corresponding first identification part is visually recognizable when viewed from an assembling direction of the plurality of optical sheets.

13. The method of assembling the backlight unit according to claim 11 further comprising:

providing an information indicating part for indicating information on the optical sheet at a position on at least one of the optical sheets different from positions where the first and the second identification parts are located; and identifying each of the optical sheets assembled into the chassis by the use of the information indicating part.

14. The method of assembling the backlight unit according to claim 13, wherein the information on the optical sheet includes any one of a characteristic, a manufacturer's name, a revision number, and a thickness.

15. The method of assembling the backlight unit according to claim 13, wherein any one of a quantity, a shape and a position of the information indicating part is changed according to the contents of the information on the optical sheet to allow the contents of the information to be distinguished through the information indicating part.

* * * * *